（12） United States Patent
Fujii

(10) Patent No.: US 6,186,529 B1
(45) Date of Patent: Feb. 13, 2001

(54) BICYCLE BRAKE MOUNTING STRUCTURE

(75) Inventor: Kazuhiro Fujii, Sakai (JP)

(73) Assignee: Shimano Inc., Osaka (JP)

( * ) Notice: Under 35 U.S.C. 154(b), the term of this patent shall be extended for 0 days.

(21) Appl. No.: 09/084,400

(22) Filed: May 27, 1998

(51) Int. Cl.[7] .................................................. B62K 1/00
(52) U.S. Cl. ...................... 280/281.1; 280/274; 280/276; 280/279; 188/24.12
(58) Field of Search .................................. 280/264, 274, 280/276, 279, 281.1, 284, 288; 188/24.11, 24.12, 24.21, 24.22, 24.14, 24.15, 24.16

(56) References Cited

U.S. PATENT DOCUMENTS

| 1,108,932 | * | 9/1914 | Ridgway | 280/276 |
|---|---|---|---|---|
| 4,008,903 | * | 2/1977 | Ramond | 188/24.22 |
| 4,421,338 | * | 12/1983 | Isono et al. | 280/276 |
| 4,744,434 | * | 5/1988 | Miyakoshi et al. | 280/276 |
| 4,744,579 | * | 5/1988 | Roatta | 280/276 |
| 4,765,443 | | 8/1988 | Cunningham | 188/24.21 |
| 4,770,435 | * | 9/1988 | Cristie | 188/24.12 |
| 4,869,351 | | 9/1989 | Romano | 188/24.21 |
| 5,499,699 | | 3/1996 | Chen | 188/24.21 |
| 5,562,397 | | 10/1996 | Lin | 280/276 |
| 5,626,355 | * | 5/1997 | Voss et al. | 280/276 |
| 5,636,716 | | 6/1997 | Sugimoto et al. | 188/24.22 |
| 5,743,284 | | 4/1998 | Lumpkin | 188/24.22 |

FOREIGN PATENT DOCUMENTS

| 9405645 | | 7/1994 | (DE) . | |
|---|---|---|---|---|
| 412373 | * | 6/1934 | (GB) | 188/24.22 |
| 450429 | | 7/1936 | (GB) . | |
| 675533 | * | 7/1952 | (GB) | 188/24.22 |
| 55-99988 | | 7/1980 | (JP) . | |
| 314463 | | 3/1991 | (JP) . | |
| 166246 | | 8/1991 | (TW) . | |
| 274271 | | 4/1996 | (TW) . | |

OTHER PUBLICATIONS

*MTB Super Selection II*, four pages, including pp. 110, 111 and 133; 1996.
*For Bikers Only, CYCLE SPORTS*; Three pages, including pp. 22–23; 1997.
*SUNTOUR*; Taiwan Sakae Ringyo Co., Ltd.; six pages; Nov. 1996.
*Campagnolo Brakes; Croce d'aune*; four pages; 1991.

* cited by examiner

*Primary Examiner*—Daniel G. DePumpo
(74) *Attorney, Agent, or Firm*—Shinjyu Global IP Counselors, LLP

(57) ABSTRACT

A bicycle brake device is coupled to a bicycle frame section, which includes one or more bicycle brake mounting structures. The bicycle frame section can be either a portion of a front fork or rear fork of a bicycle. The brake device is preferably a caliper brake device such as a cantilever brake device, a side pull brake device, or a center pull brake device. The caliper brake device has a pair of brake arms, which are pivotally coupled to either the front fork or rear fork for selectively engaging the rim of the bicycle wheel. In certain embodiments, the bicycle brake mounting structures are U-shaped brackets, which are fixedly coupled to the frame member or members. In other embodiments, the bicycle brake mounting structures are formed by a pair of separate tubular frame members, which are fixedly coupled to the remainder of the bicycle frame section. In the case of cantilever brake devices and side pull brake devices, the bicycle brake mounting structure or structures support both ends of pivot pins, while in the case of center pull brake devices, the bicycle brake mounting structure or structures support both ends of the center mounting pin.

9 Claims, 23 Drawing Sheets

BICYCLE BRAKE MOUNTING STRUCTURE

BACKGROUND OF THE INVENTION

1. Field of the Invention

This invention generally relates to a structure for mounting a bicycle brake device. More specifically, the present invention relates to a structure for supporting both ends of the mounting pin for bicycle brake device.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles which has been extensively redesigned over the past years is the bicycle brake device. Bicycle brake devices are constantly being redesigned to provide additional braking power.

There are several types of bicycle brake devices which are currently available on the market. Examples of some types of common bicycle brake devices include rim brakes and caliper brakes. With respect to caliper brakes, there are mainly three types of caliper brakes: a side pull type, a center pull type and cantilever type. In a side pull type of caliper brake device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn move the brake shoes attached to the other ends of the brake arms together against the rim of the bicycle wheel. Return springs are provided for biasing the brake arms away from the bicycle wheel rim when the rider releases the brake lever. Side pull types of caliper brake devices are commonly used in road bikes.

A center pull type of caliper brake device operates in a manner similar to the side pull type, except that the brake arms are typically attached to a brake arm bridge such that each brake arm is pivotally coupled at a separate pivot point on the brake arm bridge. The brake arm bridge is attached directly to the frame of the bicycle. A straddle cable interconnects the two lever portions of the brake arms such that a main brake wire, which is coupled to the straddle wire, pulls the lever portions of the brake arms together.

A cantilever type of caliper brake device is generally mounted on bicycles designed for off road use such as mountain bikes (MTB) and all terrain bikes (ATB). In particular, a cantilever type brake device is designed to provide a powerful braking force. A cantilever type of brake device is equipped with a pair of brake arms which are rotatably supported in a cantilever fashion on the front or rear fork of the bicycle frame, with the brake shoes attached to the upper portions of the brake arms. Typically, the lower ends of the brake arms are rotatably supported on the bicycle frame and the upper ends are linked to a brake cable or wire. The brake shoes are arranged opposite one another on either side of the bicycle wheel rim which is located between the arms. With this cantilever type of caliper brake device, the bicycle arms rotate in the closing direction when the brake cable is pulled by the brake lever, which in turn results in the brake shoes being pressed against the rim to apply a braking force.

Cantilever types of caliper brake devices have several advantages over side pull types of caliper brake devices. For example, with such a cantilever brake device, there is no need to vary the shape of the device with the size of the bicycle, as may be the case with a side pull type of caliper brake device. Moreover, cantilever type of caliper brake devices apply a more equal braking force than a side pull type caliper brake.

In view of the above, there exists a need for a bicycle frame section or a brake mounting structure which more securely supports a bicycle brake device. Moreover, there exists a need for an improved bicycle frame section or a brake mounting structure that provides improved performance of caliper brakes such as increased braking force. This invention addresses these needs in the art as well as other needs in the art which will become apparent to those skilled in the art from this disclosure.

SUMMARY OF THE INVENTION

One object of the present invention is to provide a bicycle frame section that has a pair of frames that supports both ends of the mounting pin of the brake device.

One object of the present invention is to provide a brake device which can be mounted to a bicycle frame in a manner to increase braking power.

Still another object of the present invention is to provide a bicycle frame section which can be manufactured using conventional manufacturing methods.

The foregoing objects can basically be attained by providing a bicycle frame section, comprising a first rigid frame member; a second rigid frame member spaced from the first rigid frame member; a first brake mounting member coupled to the first rigid frame member; and a second brake mounting member coupled to the second rigid frame member, the first and second brake mounting members being configured to support opposite sides of a mounting portion of a bicycle brake device therebetween.

The foregoing objects can also basically be attained by providing a bicycle frame section, comprising bicycle frame means for supporting a part of a bicycle, the bicycle frame means having first and second frame members spaced apart from each other, first brake mounting means, coupled to the first frame member, for supporting a first end of a mounting member of a brake arm; and second brake mounting means, coupled to the second frame member, for supporting a second end of the mounting member of a brake arm.

In addition, the foregoing objects can basically be attained by providing a bicycle frame section, comprising a first brake mounting member adapted to be coupled to a bicycle frame, a second brake mounting member adapted to be coupled to the bicycle frame; and a connecting member coupled between the first and second mounting members to form a brake device receiving recess therebetween.

Moreover, the foregoing objects can basically be attained by providing a method of mounting a bicycle brake, comprising the steps of: providing a bicycle frame with first and second frame members spaced apart from each other to form a brake arm receiving recess therebetween; providing a bicycle brake with a pair of brake arms movably mounted relative to each other via at least one pivot member having first and second ends; and mounting the first end of the at least one pivot member to the first frame member and the second end of the at least one pivot member to the second frame member.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
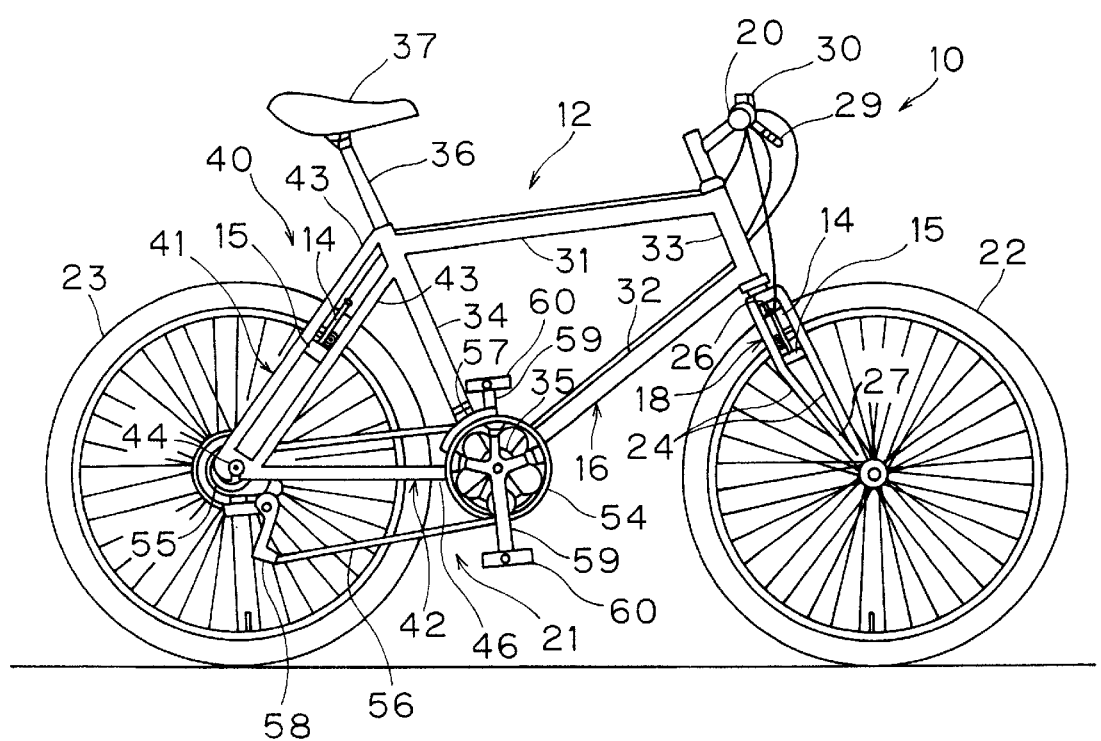
FIG. 1 is a side elevational view of an MTB style bicycle implementing a bicycle frame with front and rear cantilever brake devices coupled thereto via bicycle brake mounting structures in accordance with a first embodiment of the present invention.

Referring initially to FIG. 1, a bicycle 10 having a bicycle frame 12 is illustrated in accordance with a first embodiment of the present invention. Bicycle frame 12 has a pair of bicycle brake devices 14 fixedly coupled to frame 12 via brake mounting structures 15 in accordance with a first embodiment of the present invention. While a MTB style bicycle is illustrated, it will be apparent to those skilled in the art from this disclosure that the present invention can be used with other styles of bicycles without departing from the scope of the present invention.

Basically, bicycle frame 12 has a main bicycle frame body 16, which constitutes the skeleton of the bicycle body. Bicycle frame body 16 is generally constructed of rigid tubular frame sections or members which are rigidly coupled together by welding or any other conventional method. The tubular frame members can be constructed of any suitable rigid material such as aluminum, titanium, etc.

Bicycle frame 12 also has a front fork 18 constructed mainly of rigid tubular frame members which are rigidly coupled together by welding or any other conventional method. Front fork 18 is rotatably supported by frame body 16 to rotate about an inclined vertical axle in the front portion of frame body 16. The bicycle 10 further comprises a handlebar 20 that is fixedly coupled to the front fork 18, a drive train 21 that is attached to the lower portion of the frame body 16 for converting a pedaling force to drive force, a front wheel 22 that is rotatably supported at the lower end of the front fork 18, a rear wheel 23 that is rotatably supported in the back portion of the frame body 16, and front and back braking devices 14.

Figure 2:
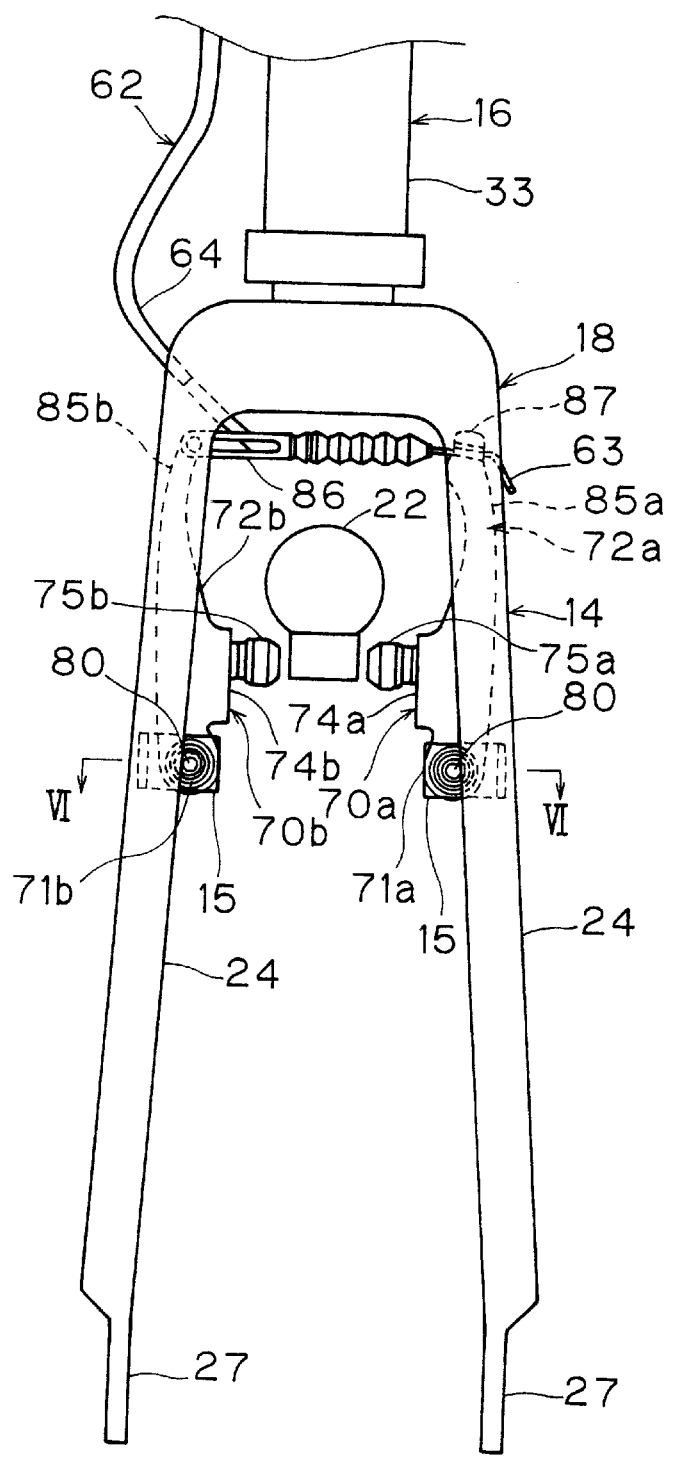
FIG. 2 is a partial front elevational view of the front fork with the front cantilever bicycle brake device coupled thereto via a pair of brake mounting structures in accordance with a first embodiment of the present invention.
Figure 3:
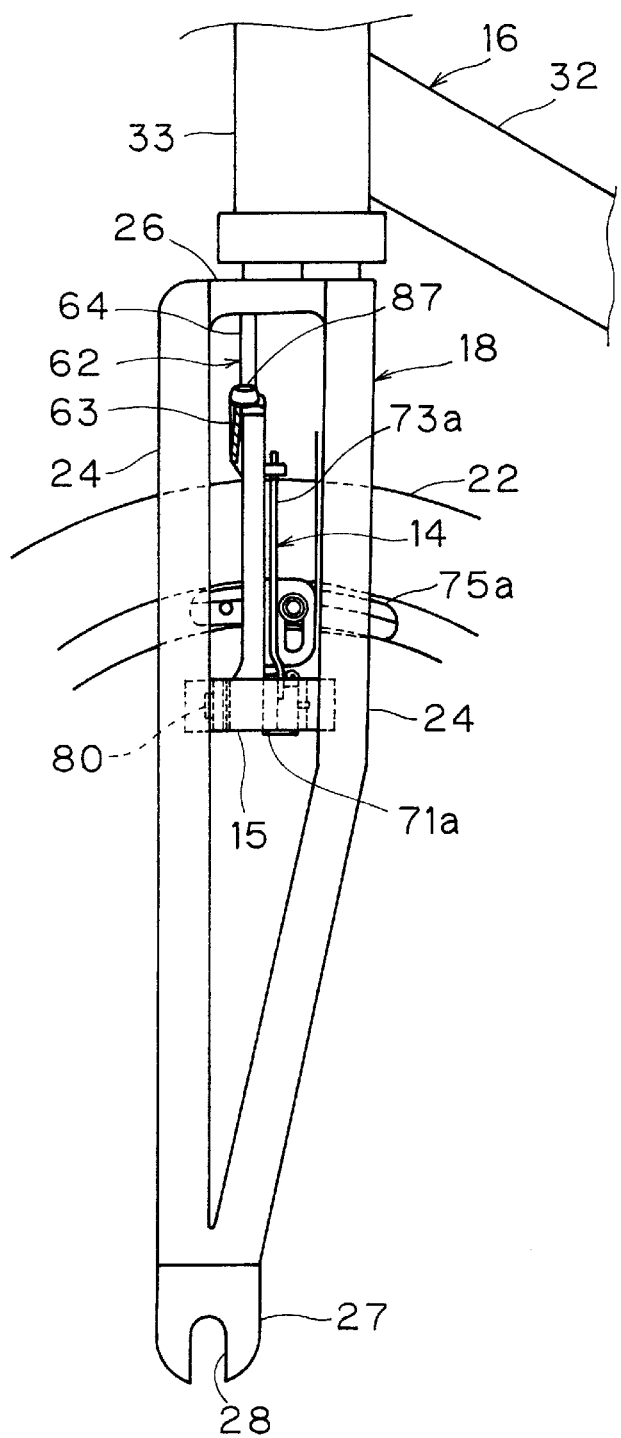
FIG. 3 is a partial right side elevational view of the front fork illustrated in FIGS. 1 and 2 with certain parts removed for purposes of illustration.

As seen in FIGS. 2 and 3, the front fork 18 is rotatably coupled at its upper end to frame body 16 and has a bifurcated lower portion for receiving a front wheel 22 therebetween (FIG. 1). The front fork 18 has two pairs of rigid tubular frame members 24 with their upper ends coupled together by an intermediate or connecting member 26 and their lower ends joined together by a pair of front wheel mounting ends or plates 27. Each of the front wheel mounting ends or plates 27 has an open ended slot 28 for fixedly receiving the axle of the front hub of wheel 22 in a conventional manner.

Figure 6:
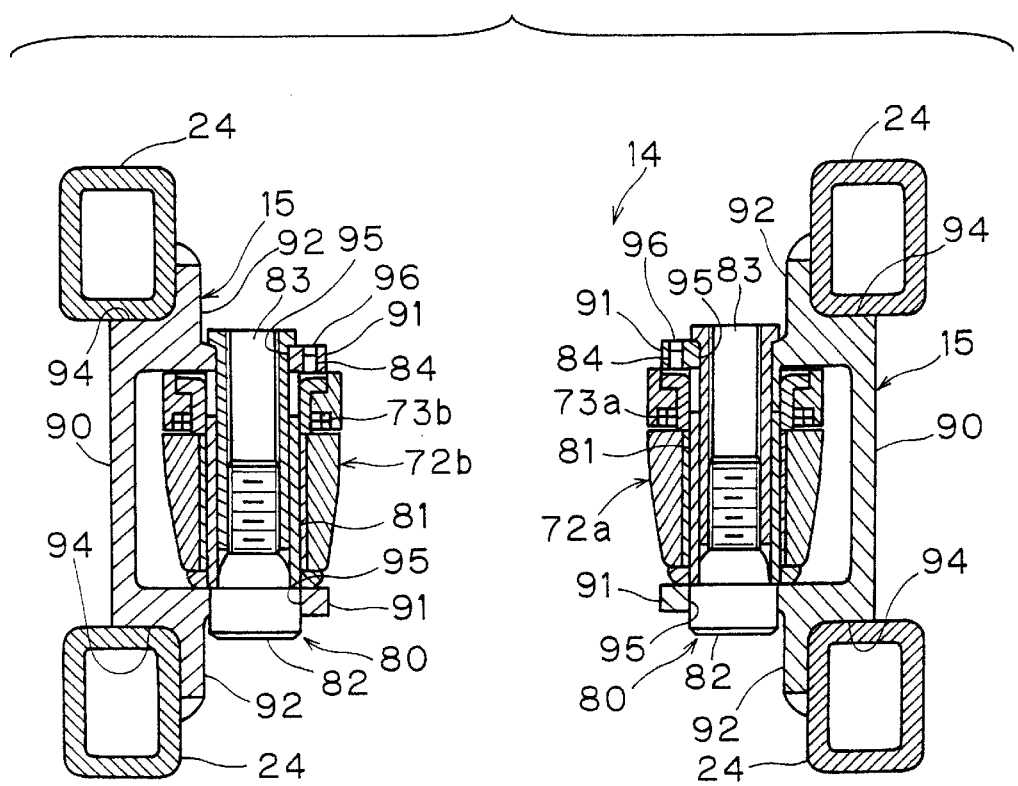
FIG. 6 is a cross-sectional view of the front bicycle brake device as seen along section line 6—6 of FIG. 2 with the brake mounting structures fixedly coupled to the front fork of the bicycle frame.
Figure 7:
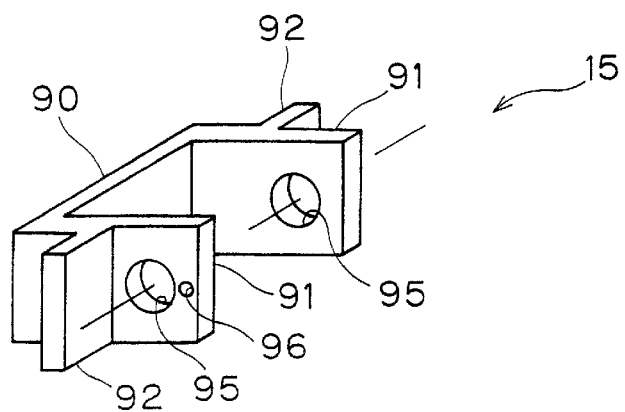
FIG. 7 is a perspective view of one of the brake mounting structures in accordance with the first embodiment of the present invention.

As seen in FIGS. 2, 3 and 6, the front bicycle brake device 14 is fixedly coupled to front fork 18 via a pair of brake mounting structures 15. Each of the brake mounting structures 15 is rigidly and fixedly coupled to a pair of adjacent frame members 24. For example, brake mounting structures 15 are welded between frame members 24. Brake mounting structures 15 are shown in FIGS. 6 and 7 and discussed in detail below.

Referring again to FIG. 1, the handlebar 20 has a handlebar stem adjustably coupled to the top portion of the front fork 18 for adjusting the height of the handlebar, and a pair of handle portions extending to the right and left from the top end of the handlebar stem. Grips (only one shown) are fitted on the two ends of the handle portions of the handlebar 20. Brake levers 29 (only one shown) and shifting levers 30 (only one shown) are located adjacent to these grips in a conventional manner. The general construction and operation of brake levers 29 and shifting levers 30 are generally old and well known, and thus, they will not be discussed or illustrated in detail herein.

Still referring to FIG. 1, the frame body 16 is a diamond shaped frame with a front triangle and a back triangle located behind the front triangle. Of course, the present invention can be used with other types of bicycle frames. The front triangle comprises a horizontally disposed top tube 31, an angled down tube 32 that is located beneath the top tube 31 and that rises toward the front, a head tube 33 for joining the front ends of the top tube 31 and the down tube 32, and a seat tube 34 that rises at an angle and joins the back ends of the top tube 31 and the down tube 32. A bottom bracket shell 35 is formed at the joint between the seat tube 34 and the down tube 32. A seat post 36 equipped with a saddle 37 is slideably coupled to the seat tube 34 for vertically adjusting the position of the seat post 36 and saddle 37.

The back triangle comprises a rear or back fork 40 having a seat stay 41 rigidly coupled to seat tube 34 and a chain stay 42 rigidly coupled to bottom bracket shell 35. In particular, the seat stay 41 has four rigid tubular frame members 43 with the front ends of each tubular frame members 43 rigidly coupled to seat tube 34. The tubular frame members 43 extend downwardly from seat tube 34 in a bifurcated manner for receiving rear wheel 23 therebetween. In other words, a pair of tubular frame members 43 are located on each side of rear wheel 23. The rear ends of adjacent tubular frame members 43 are each interconnected together by a rear fork mounting end or plate 44. Each of the rear fork mounting ends or plates 44 has an open ended slot 45 for fixedly receiving the axle of the rear hub in a conventional manner.

Figure 4:
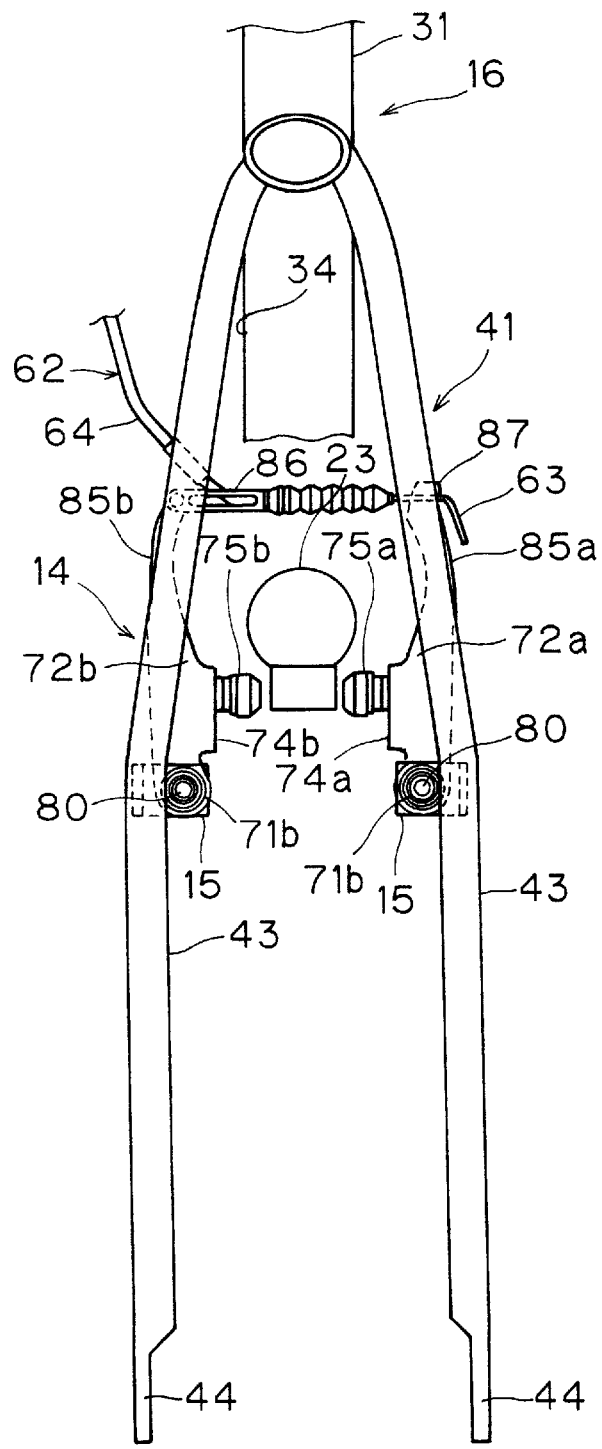
FIG. 4 is a partial top view of the seat stay section of the rear fork illustrated in FIG. 1 with the rear cantilever bicycle brake device coupled thereto via a pair of brake mounting structures in accordance with a first embodiment of the present invention.
Figure 5:
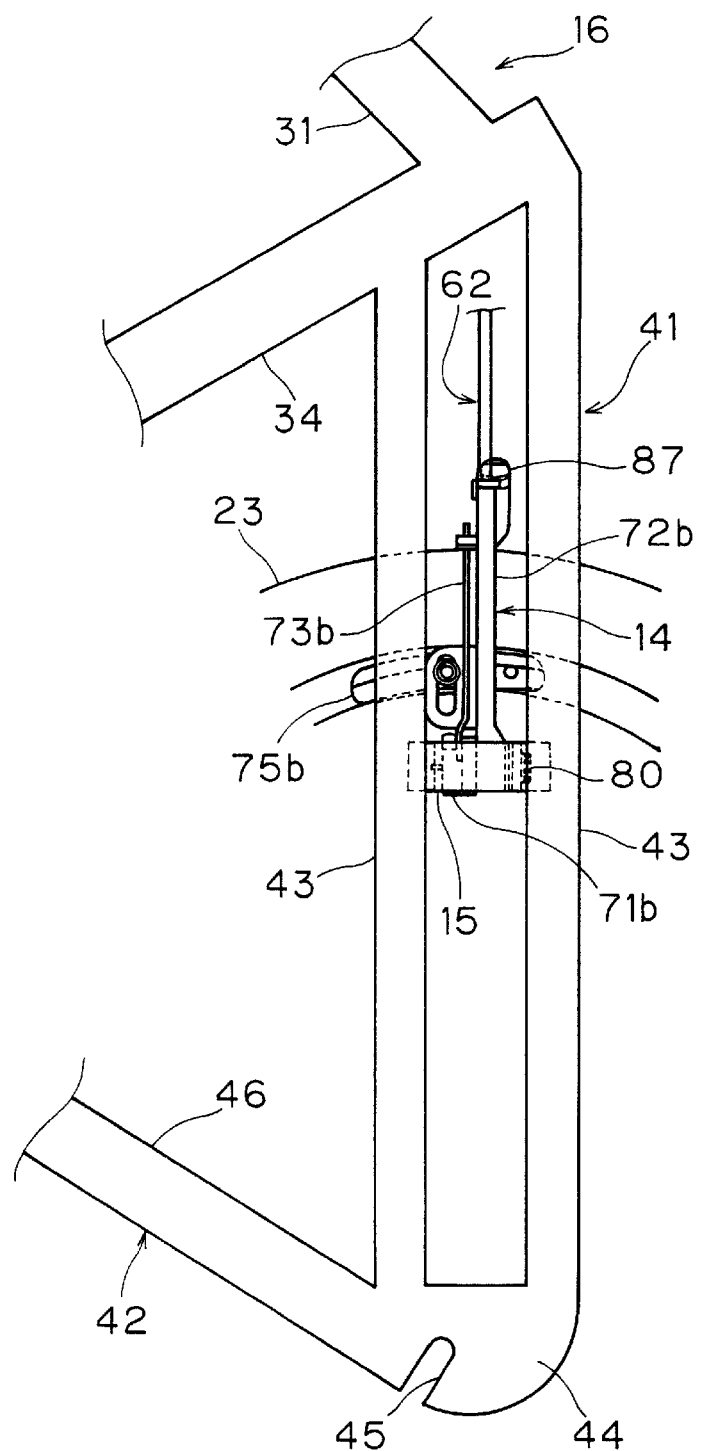
FIG. 5 is a partial side elevational view of the seat stay section of the rear fork illustrated in FIGS. 1 and 4 with the rear cantilever bicycle brake device coupled thereto.

As seen in FIGS. 4 and 5, the rear bicycle brake device 14 of the first embodiment is also fixedly coupled to the seat stay 41 via a pair of brake mounting structures 15. In other words, the front and rear bicycle brake devices 14 are fixedly coupled to frame 12 in substantially the same manner, except for different frame members. Each of the brake mounting structures 15 of the rear bicycle brake device 14 is rigidly and fixedly coupled to a pair of adjacent frame members 43. For example, brake mounting structures 15 of the rear bicycle brake device 14 are welded to a pair of adjacent frame members 43 as seen in FIG. 5.

Referring to FIGS. 1 and 5, chain stay 42 has a pair of rigid tubular frame members 46 with one of the frame members 46 located on each side of rear wheel 23. Chain stay 42 has the front ends of tubular frame members 46 rigidly coupled to bottom bracket shell 35 as seen in FIG. 1. The tubular frame members 46 extend backward from bottom bracket shell 35 where they are joined at their back ends by the rear fork mounting ends or plates 44.

As seen in FIG. 1, the drive train 21 basically comprises a front chainwheel and crank assembly 54 coupled to the bottom bracket shell 35, a set of rear chainwheels or sprockets 55 non-rotatably attached to the free hub of rear wheel 23, a chain 56 that passes over the front chainwheel and crank assembly 54 and rear chainwheels 55, and passes through front and rear derailleurs 57 and 58 for shifting gears in a conventional manner via shifting levers 30.

As shown in FIG. 1, chainwheel and crank assembly 54 comprises a bottom bracket (not shown), right and left crank arms 59, with pedals 60 attached to the tip of each crank arm 59. The bottom bracket connects right and left crank arms 59 together. A spindle is rotatably supported by the bottom bracket which in turn is mounted in bottom bracket shell 35 of frame body 16 in a conventional manner.

As seen in FIGS. 2 and 3, front bicycle brake device 14 is coupled to front fork 18 for engaging and applying a braking force against the rim of front bicycle wheel 22. Similarly, as seen in FIGS. 4 and 5, the rear bicycle brake device 14 is coupled to rear fork 40 for engaging and applying a braking force against the rim of rear bicycle wheel 23. In the first embodiment, bicycle brake devices 14 are illustrated as cantilever brake devices. Of course, it will be apparent to those skilled in the art from this disclosure that bicycle frame 12 can be modified to accommodate other styles of brakes. Brake devices 14 have an increased braking force over prior art brake devices in that the brake devices 14 are pivotally supported by mounting structures 15 as discussed below.

Bicycle brake devices 14 are operated in a substantially conventional manner by the rider via conventional brake operating devices or levers 29 which are mounted on handle bar 20 of bicycle 10 in a conventional manner. Bicycles and their various components are well-known in the prior art, and thus, bicycle 10 and its various components will not be discussed or illustrated in detail herein.

As best seen in FIGS. 1, 2 and 4, brake devices 14 are operatively coupled to brake operating devices 29 via conventional brake cables 62, each having an inner brake wire 63 and an outer casing 64. Basically, the rider operates one or both of the brake operating devices 29 to cause one or both of the brake devices 14 to move inwardly for applying a braking force against the rim of one or both of the bicycle wheels 22 and 23. Upon release of the brake operating devices 29, brake devices 14 will release the rim to allow bicycle wheels 22 and 23 to freely rotate.

As best seen in FIGS. 2 and 4, each of the brake devices 14 basically includes a pair of brake mechanisms 70a and 70b which are substantially mirror images of each other, except for their connections to brake cable 62. Referring to FIGS. 2–6, right brake mechanism 70a basically includes a mounting assembly 71a, a brake arm 72a, a return spring 73a, and a brake shoe 75a, while left brake mechanism 70b basically includes a mounting assembly 71b, a brake arm 72b, a return spring 73b and a brake shoe 75b. Mounting assemblies 71a and 71b are fixedly coupled to brake mounting structures 15 for fixedly coupling brake device 14 to the tubular frame members of frame 12.

Brake arms 72a and 72b are preferably constructed of a suitable rigid material. For example, the brake arms can be cast or machined from any suitable material such as aluminum, titanium, dense plastic, ceramic, acrylic, etc. Preferably, brake arms 72a and 72b are constructed of a lightweight material to minimize the weight of brake devices 14. Brake arms 72a and 72b are substantially identical to each other, except that their upper ends are slightly modified for accommodating conventional cable connections or wire mounting portions as seen in FIGS. 2 and 4.

Brake arms 72a and 72b are pivotally coupled to mounting assemblies 71a and 71b, respectively, for movement between a release position and a braking position. Return springs 73a and 73b are coupled between mounting assemblies 71a and 71b and brake arms 72a and 72b, respectively, for pivotally biasing brake arms 72a and 72b to their release positions. Brake shoes 75a and 75b are fixedly coupled to shoe attachment portions 74a and 74b of brake arms 72a and 72b, respectively.

Each of the mounting assemblies 71a and 71b are basically identical and include a mounting or pivot pin 80 and a bushing arrangement 81. The mounting or pivot pins 80 are each preferably constructed of two pieces, e.g., a bolt 82 and an internally threaded sleeve 83. The bushing arrangements 81 surround pivot pins 80 and are fixedly secured to mounting structures 15 via engagement pins 84 as seen in FIG. 6. Since pivot pins 80 and bushing arrangements 81 are well-known in the art, they will not be discussed in detail herein.

Brake arms 72a and 72b have their upper portions 85a and 85b coupled to brake cable 62 for moving brake arms 72a and 72b from a release position to a braking position. Specifically, upper portion 84a of brake arm 72a is coupled to inner brake wire 63 of brake cable 62 via lock bolt 87 which is received into a threaded hole. Lock bolt 87 clamps inner brake wire 63 against upper portion 85a of brake arm 72a. The outer casing 64 of brake cable 62 is coupled to upper portion 85b of brake arm 72b by connecting arm 86. In particular, as best seen in FIG. 4, connecting arm 86 is pivotally coupled to upper portion 85b of brake arm 72b and outer casing 64 of brake cable 62. Application of brake operating device 29 causes upper portions 85a and 85b to move inwardly towards each other and the friction pads of brake shoes 75a and/or 75b to engage the rim of the wheels 22 and/or 23.

The upper portions 85a and 85b of brake arms 72a and 72b have shoe attachment portions 74a and 74b integrally formed therewith. Of course, it will be apparent to those skilled in the art from this disclosure that shoe attachment portions 74a and 74b can be pivotally coupled to brake arms 72a and 72b for attaching brake shoes 75a and 75b thereto in a conventional manner as known in the art. Of course, other types of shoe attachment portions can be utilized as needed and/or desired. As best seen in FIG. 6, brake arms 72a and 72b each have a hole for receiving one of the pivot pins 80 therethrough. The lower portions of brake arms 72a and 72b are pivotally coupled to mounting assemblies 71a and 71b such that brake arms 72a and 72b can rotate about the pivot axes formed by pivot pins 80.

Return spring or biasing member 73a is fixedly coupled at one end to mounting assembly 71 via a fastener or screw in a conventional manner. Return spring 73a is designed to normally bias brake arm 72a in a clockwise direction as seen in FIGS. 2 and 4. Accordingly, brake arm 72a is biased by return spring 73a such that brake shoe 75a normally moves away from the rim of bicycle wheel 22 or 23.

Return spring or biasing member 73b is similarly designed to normally bias brake arm 72b to a release position. Specifically, brake arm 72b is biased by return spring 73b in a counter-clockwise direction as seen in FIGS. 2 and 4. Accordingly, brake arm 72b is biased by return spring 73b such that brake shoe 75b normally moves away from the rim of bicycle wheel 22 or 23.

Brake shoe 75a is attached to shoe attachment portion 74a such that brake shoe 75a can be adjusted vertically to ensure proper engagement between brake shoe 75a and the rim of bicycle wheel 22 or 23. Similarly, brake shoe 75b is attached to shoe attachment portion 74b such that brake shoe 75b can be adjusted vertically to ensure proper engagement between brake shoe 75b and the rim of bicycle wheel 22 or 23.

As seen in FIGS. 6 and 7, the brake mounting structures 15 are preferably substantially U-shaped members which are fixedly and rigidly coupled to a pair of tubular frame members of bicycle frame 12. The brake mounting structures 15 are constructed of a hard rigid material, such as steel, aluminum, titanium or a non-metallic composite material. Basically, each bicycle brake mounting structure 15 (brake mounting member) has an intermediate connecting member 90 and a pair of brake mounting flanges 91 (brake mounting portions) extending substantially perpendicular from opposite ends of an intermediate connecting member 90. An attachment flange 92 extends outwardly from each of the mounting flanges 91 for attaching mounting structure 15 to frame members 24 of front fork 18 as seen in FIG. 6. A mounting recess 94 is formed between flanges 91 and 92 for receiving a tubular frame member. Preferably, brake mounting structure 15 is welded or otherwise rigidly and fixedly secured to the tubular frame members such that the tubular frame members are located within the recesses 94. Each of the brake mounting flanges 91 has a pivot mounting hole 95 for receiving one end of the pivot pin 80 for the brake arm. The pin mounting holes 95 are preferably axially aligned with one another. Also, one of the mounting flanges 91 of each of the mounting structures 15 also has a smaller hole 96 for receiving one of the engagement pins 84 as seen in FIG. 6 of the mounting assemblies 71a or 71b.

In operation, when the rider operates one or both of the brake levers of the brake operating devices 29, the inner wire 63 of the brake cable 62 is pulled within the outer casing 64 of the brake cable 62 so that the upper portions 85a and 85b of brake arms 72a and 72b are pulled inwardly. Thereafter, the friction pads of the brake shoes 75a and 75b are pressed against the side surfaces of the rim of the bicycle wheel 22 and/or 23, thus causing a braking action to be performed. In other words, brake arm 72a rotates in a counter clockwise direction about pivot pin 80 against the force of return spring 73a and brake arm 72b rotates in a clockwise direction about pivot pin 80 against the force of return spring 73b. Once the rider releases the brake lever of the brake operating devices 29, the inner brake wire 63 of the brake cable 62 is relaxed so that the return springs 73a and 73b cause the brake arms 72a and 72b to pivot in their opening directions. As a result, the inner faces of the friction pads of brake shoes 75a and 75b are withdrawn from the side surfaces of the rim of the bicycle wheel 22 and/or 23 so that the braking action is released.

Second Embodiment

Figure 8:
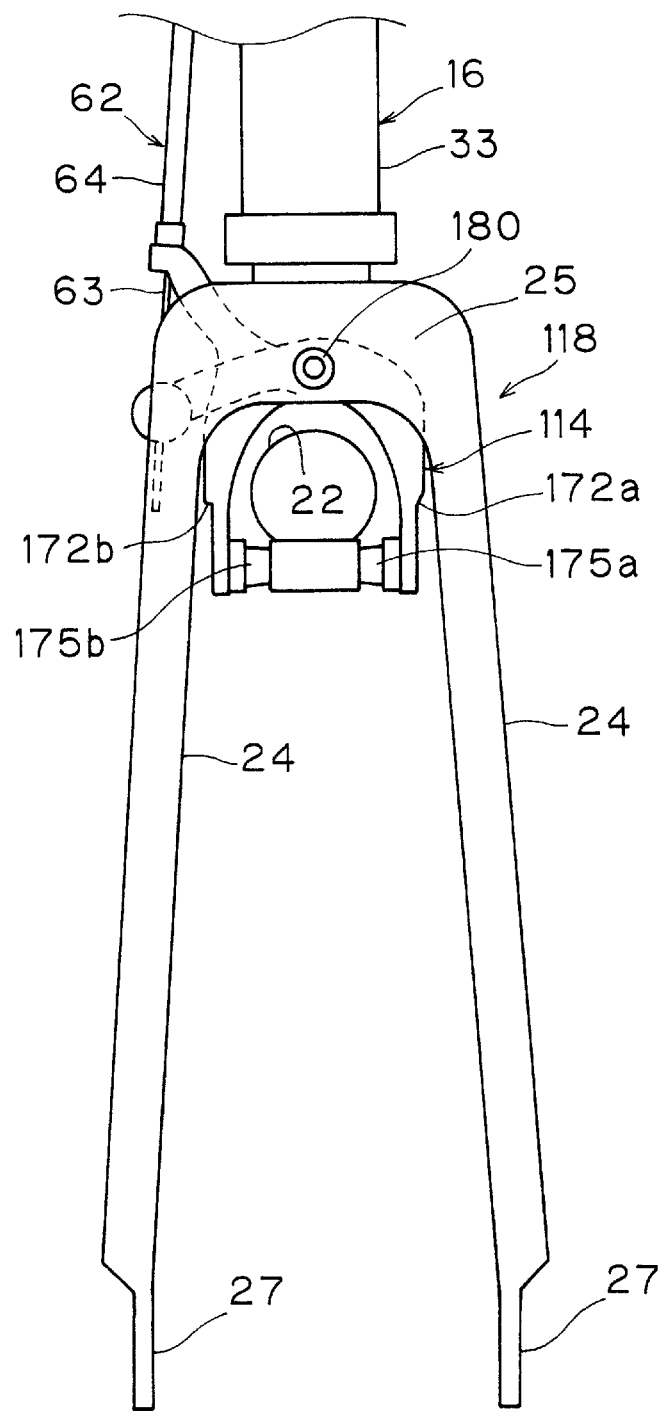
FIG. 8 is a partial front elevational view of a modified front fork with a side pull brake device coupled thereto in accordance with a second embodiment of the present invention.
Figure 9:
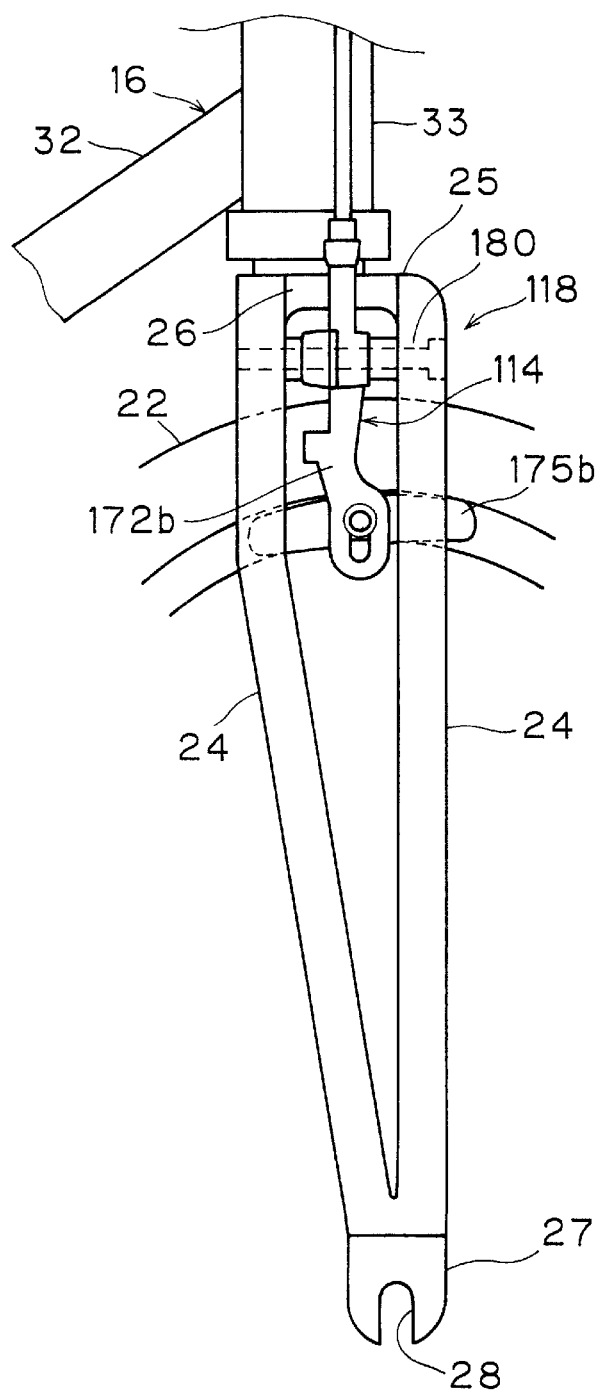
FIG. 9 is a partial left side elevational view of the modified front fork and the side pull brake device illustrated in FIG. 8.

Referring now to FIGS. 8 and 9, a portion of bicycle frame 12 with a modified front fork 118 is illustrated in accordance with a second embodiment of the present invention. This second embodiment differs from the first embodiment in that instead of utilizing a cantilever brake device 14, a side pull type of caliper brake device 114 is used. Also, the front fork 118 does not have brake mounting structures 15. Rather, the front fork 118 has been modified such that attachment component 25 directly supports brake device 114. In view of these similarities between the first and second embodiments, only the main differences between the first and second embodiments will be discussed and illustrated herein. Moreover, since the second embodiment utilizes many of the same parts of the first embodiment, these parts will be given the same reference numerals.

Caliper brake device 114 is a side pull type of caliper brake, and basically comprises a pair of brake arms 172a and 172b pivotally coupled together by a center mounting or pivot pin 180. The brake arms 172a and 172b are normally biased by a return spring (not shown) to a release position in which the brake pads of the brake shoes 175a and 175b are spaced from the rim of the front wheel 22.

As in the first embodiment, each end of the pivot pin 180 is supported by a rigid frame member or section of front fork 118. However, in this embodiment, no mounting bracket is used. More specifically, front fork 118 has two pairs of rigid tubular frame members 24 with their upper ends coupled together by a U-shaped attachment component 25, and their lower ends joined together by a pair of front wheel mounting ends or plates 27. Each of the front wheel mounting ends or plates 27 has an open ended slot 28 for fixedly receiving the axle of the front hub of wheel 22 in a conventional manner. Brake device 114 is fixedly coupled to the U-shaped attachment component 25 by the pivot pin 180. Preferably, the pivot pin 180 is comprised of a nut and bolt arrangement. As seen in FIG. 9, both ends of pivot pin 180 is supported by the U-shaped attachment component 25. Of course, other types of pivot pins could be utilized as needed and/or desired.

Brake device 114 is operatively coupled to a brake operating device via brake cable 62 which has an inner brake wire 63 and an outer casing 64. Basically, the rider will operate the brake operating device coupled to the handlebar which will in turn cause the brake device 114 to move inwardly to apply a braking force against the rim of the front bicycle wheel 22. Upon release of the brake operating device, brake device 114 will release the rim to allow the bicycle wheel 22 to freely rotate.

Third Embodiment

Figure 10:
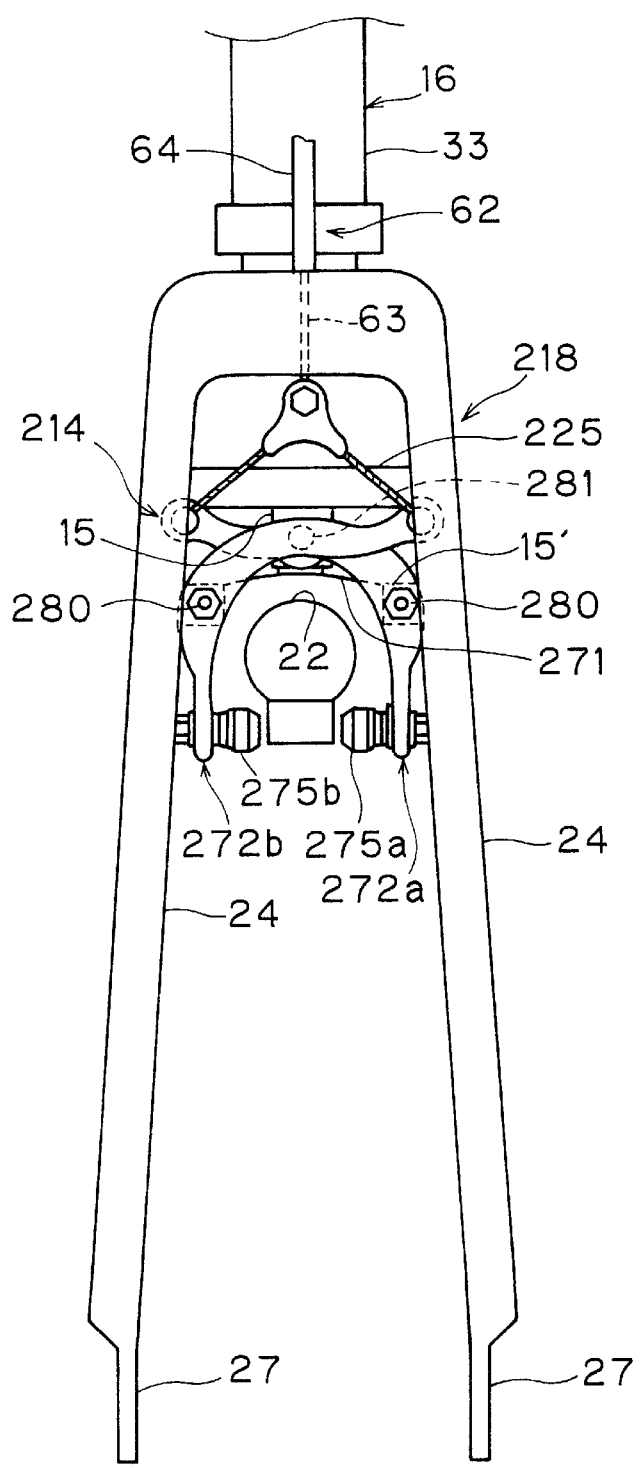
FIG. 10 is a partial front elevational view of a modified front fork with a center pull brake device coupled thereto via a brake mounting structure in accordance with a third embodiment of the present invention.
Figure 11:
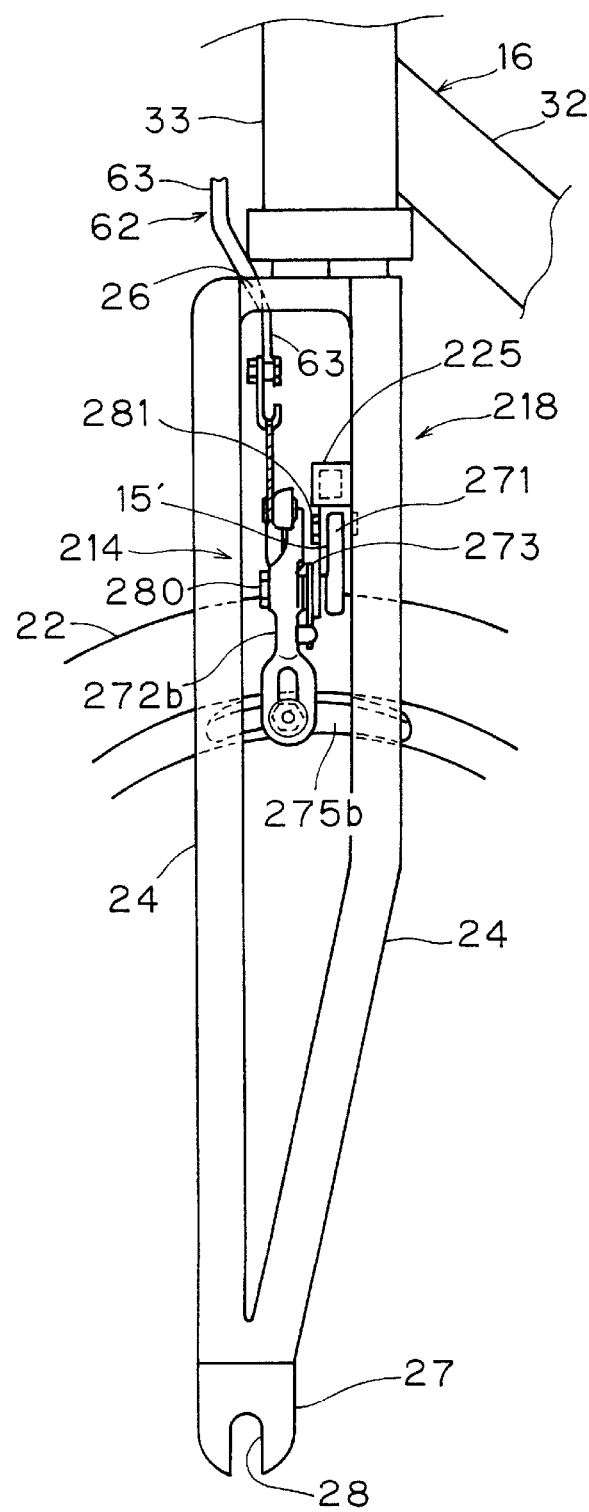
FIG. 11 is a partial right side elevational view of the front fork and center pull brake device illustrated in FIG. 10.

Referring now to FIGS. 10 and 11, a portion of bicycle frame 12 with a modified front fork 218 is illustrated in accordance with a third embodiment of the present invention. This third embodiment differs from the first embodiment in that instead of utilizing a cantilever brake device 14, a center pull type of caliper brake device 214 is used by adding a tubular frame member 225 and a single brake mounting structure 15'. In view of these similarities between the two embodiments, only the main differences between the first and third embodiments will be discussed and illustrated herein. Moreover, since the third embodiment utilizes many of the same parts of the first embodiment, these parts will be given the same reference numerals.

Basically, caliper brake device 214 has a brake arm bridge 271 with a pair of brake arms 272a and 272b pivotally coupled to brake arm bridge 271 by pivot pins 280. The brake arm bridge 271 is fixedly coupled to the brake mounting structure 15' via a center mounting bolt 281. The brake arms 272a and 272b are normally biased relative to brake arm bridge 271 by a return spring 273 to a release position. In the release position, the brake pads of the brake shoes 275a and 275b are spaced from the rim of the front wheel 22.

Brake device 214 is supported by brake mounting structure 15', which in turn is rigidly mounted to rigid tubular frame members 225 of front fork 218. More specifically, similar to the first embodiment, front fork 218 has two pairs of rigid tubular frame members 24 with their upper ends coupled together by a U-shaped attachment component 25, and their lower ends joined together by a pair of front wheel mounting ends or plates 27. Each of the front wheel mounting ends or plates 27 has an open ended slot 28 for fixedly receiving the axle of the front hub of wheel 22 in a conventional manner. However, unlike the first embodiment, front fork 218 also has a frame member 225, which extends between opposite frame members 24. Brake mounting structure 15' is fixedly coupled to frame member 225 by welds or any other suitable method.

It will be apparent to those skilled in the art that a brake mounting structure like the one shown in FIG. 7 can be used with a pair of frame members as needed and/or desired. Moreover, a more conventional front fork can be used to mount brake device 214 thereto in accordance with the present invention.

Caliper brake device 214 is a center pull type brake, which is mounted to front fork 218 via a mounting structure 15'. Mounting structure 15' is a substantially U-shaped member, which is similar to mounting structure 15 of the first embodiment. Brake mounting structure 15' is preferably fixedly and rigidly coupled to frame member 225 of bicycle frame 12. Basically, bicycle brake mounting structure 15' has an intermediate connecting member and a pair of brake mounting flanges extending substantially perpendicular from opposite ends of an intermediate connecting member. Each of the brake mounting flanges has a mounting hole for receiving one end of the mounting pin 281 of the bicycle brake device 214. The pin mounting holes are preferably axially aligned with one another. A mounting recess is formed between flanges for receiving the brake bridge arm 271 of bicycle brake device 214 therebetween. Preferably, brake mounting structure 15' is welded or otherwise rigidly and fixedly secured to the tubular frame member 225.

Brake device 214 is operatively coupled to a brake operating device via brake cable 62 which has an inner brake wire 63 and an outer casing 64. Basically, the rider will operate the brake operating device coupled to the handlebar which will in turn cause the brake arms 272a and 272b of brake device 214 to move inwardly to apply a braking force against the rim of the front bicycle wheel 22. Upon release of the brake operating device, brake device 214 will release the rim to allow the bicycle wheel 22 to freely rotate.

Fourth Embodiment

Figure 12:
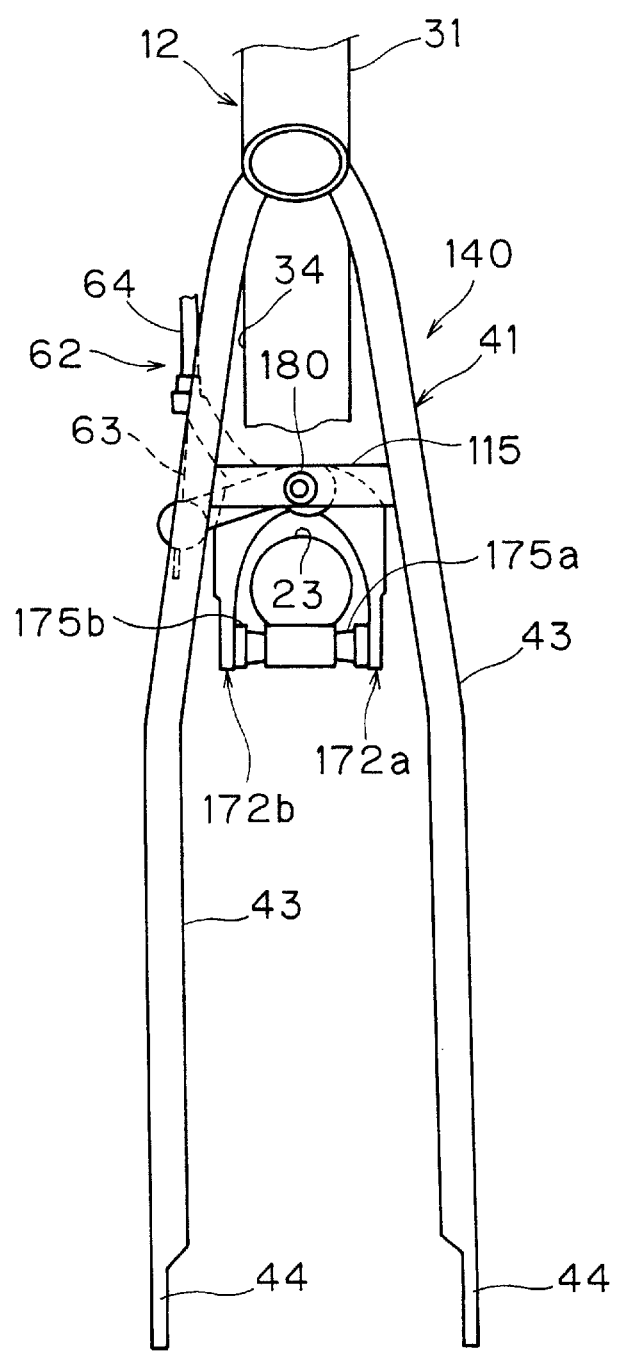
FIG. 12 is a partial top view of a modified bicycle frame having a side pull brake device movably coupled directly to the seat stay section via a pair of brake mounting members or structures in accordance with a fourth embodiment of the present invention.
Figure 13:
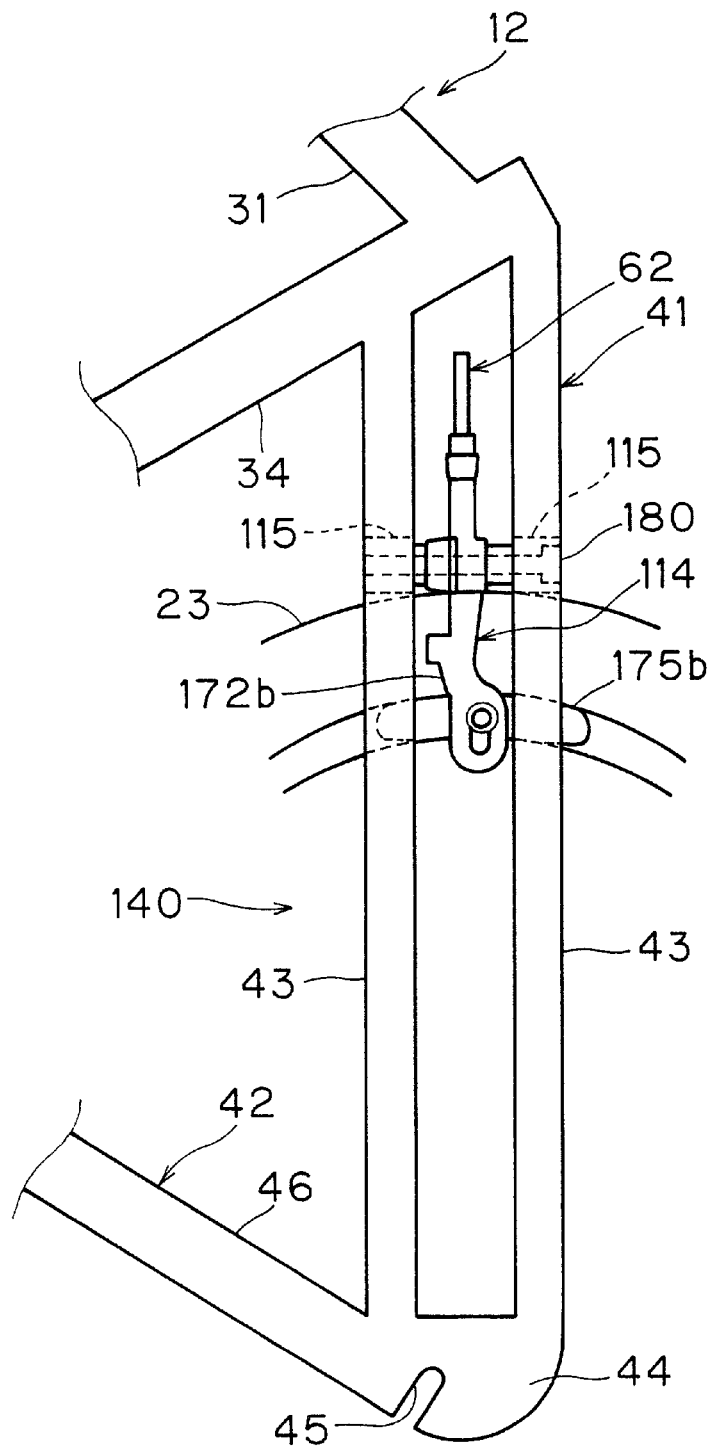
FIG. 13 is a partial side elevational view of the modified bicycle frame illustrated in FIG. 12 with the side pull brake device movably mounted to the seat stay section via the brake mounting members or structures.

Referring now to FIGS. 12 and 13, the rear fork portion 140 of a modified bicycle frame 12 is illustrated in accordance with a fourth embodiment of the present invention.

Specifically, this fourth embodiment differs from the first embodiment in that the seat stay 41 of frame 12 has been modified to support a side pull caliper brake device 114. In view of these similarities between the two embodiments, only the main differences between the first and fourth embodiments will be discussed and illustrated herein. Moreover, since the fourth embodiment utilizes many of the same parts of the first embodiment, these parts will be given the same reference numerals.

Specifically, a pair of tubular frame members 115 are coupled to the frame members 43 of the seat stay 41. Each of the tubular frame members 115 have an axially aligned hole for receiving pivot or mounting pin 180. Pin 180 is preferably a bolt and nut arrangement. Preferably, the frame members 115 are parallel to each other and together form a brake mounting structure. In other words, frame members 115 basically correspond to brake mounting flanges 91 of brake mounting structure 15.

Brake device 114 is operatively coupled to a brake operating device via brake cable 62 which has an inner brake wire 63 and an outer casing 64. Basically, the rider will operate the brake operating device coupled to the handlebar which will in turn cause the brake arms 172a and 172b of brake device 114 to move inwardly to apply a braking force against the rim of the rear bicycle wheel 23. Upon release of the brake operating device, brake device 114 will release the rim to allow the bicycle wheel 23 to freely rotate.

Fifth Embodiment

Figure 14:
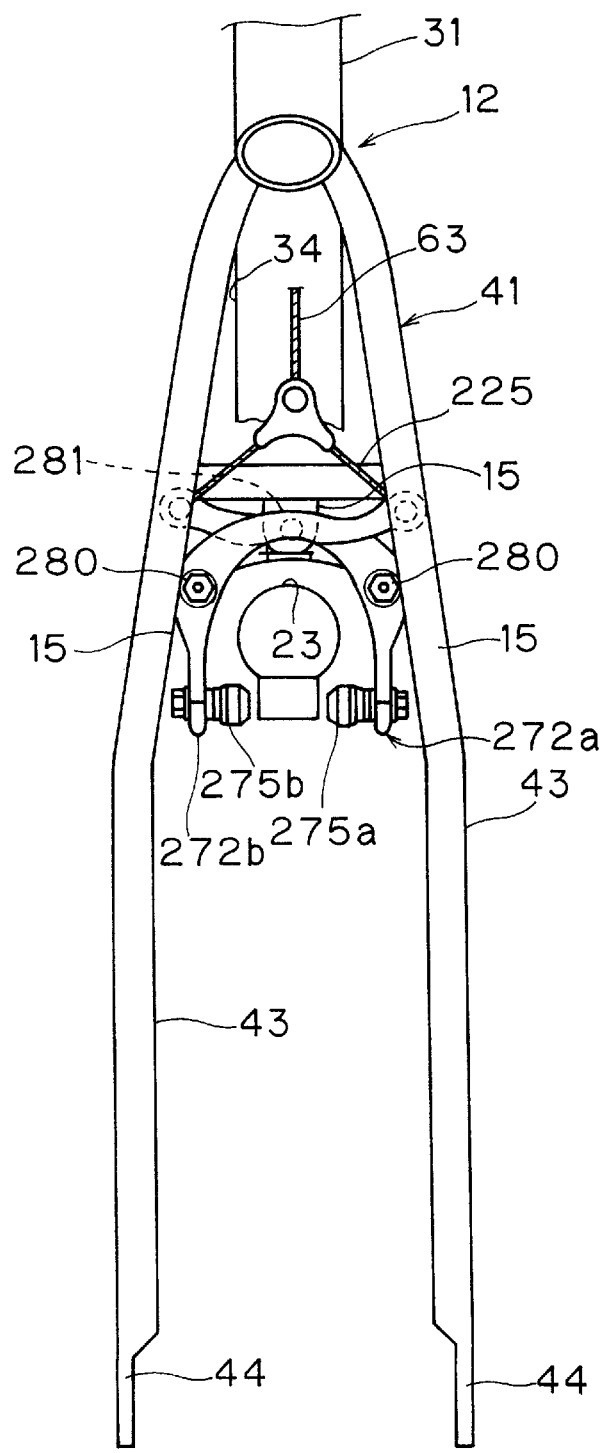
FIG. 14 is a partial top view of a modified bicycle frame with a center pull brake device movably coupled to the seat stay section via a bicycle brake mounting structure in accordance with a fifth embodiment of the present invention.
Figure 15:
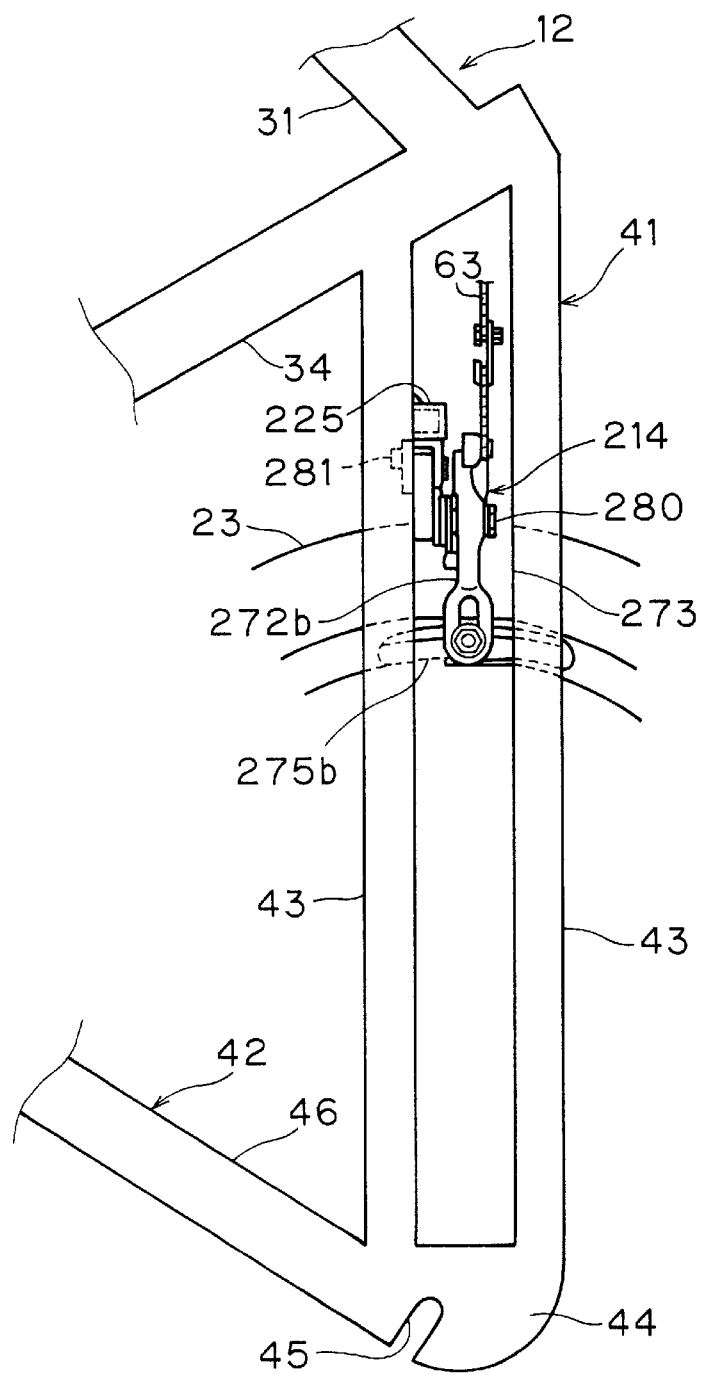
FIG. 15 is a partial side elevational view of the modified bicycle frame illustrated in FIG. 14 with the center pull brake device movably attached to the seat stay section via the brake mounting structures.

Referring now to FIGS. 14 and 15, a modified rear fork portion 40 of a bicycle frame 12 is illustrated in accordance with a fifth embodiment of the present invention. This fifth embodiment differs from the first embodiment in that the seat stay 41 of frame 12 has been slightly modified to support a center pull caliper brake device 214 in a manner which is similar to the third embodiment. In view of these similarities between the fifth embodiment and the first and third embodiments, only the main differences of the fifth embodiment will be discussed and illustrated herein. Moreover, since the fifth embodiment utilizes many of the same parts of the first and third embodiments, these parts will be given the same reference numerals.

Caliper brake device 214 is a center pull type brake, which is mounted to the seat stay 41 of the rear fork via a mounting structures 15'. As mentioned above, caliper brake device 214 basically has a brake arm bridge 271 with a pair of brake arms 272a and 272b pivotally coupled to brake arm bridge 271 by pivot pins 280. The brake arm bridge 271 is fixedly coupled to the brake mounting structure 15' via a center mounting bolt 281. The brake arms 272a and 272b are normally biased relative to brake arm bridge 271 by a return spring 273 to a release position. In the release position, the brake pads of the brake shoes 275a and 275b are spaced from the rim of the rear wheel 23.

It will be apparent to those skilled in the art that a brake mounting structure like the one shown in FIG. 7 can be used with a pair of frame members as needed and/or desired. Moreover, a more conventional front fork can be used to mount brake device 214 thereto in accordance with the present invention.

Brake device 214 is supported by brake mounting structure 15' to rigid tubular frame member 225 of seat stay 41. More specifically, similar to the first embodiment, seat stay 41 has two pairs of rigid tubular frame members 43 with their upper ends coupled seat tube 34, and their lower ends joined together by a pair of front wheel mounting ends or plates 44. Each of the rear wheel mounting ends or plates 44 has an open ended slot 45 for fixedly receiving the axle of the rear hub of wheel 23 in a conventional manner. However, unlike the first embodiment, seat stay 41 also has a frame member 225, which extends between opposite frame members 43.

Brake device 214 is operatively coupled to a brake operating device via brake cable 62 which has an inner brake wire 63 and an outer casing 64. Basically, the rider will operate the brake operating device coupled to the handlebar which will in turn cause the brake arms 272a and 272b of brake device 214 to move inwardly to apply a braking force against the rim of the rear bicycle wheel 23. Upon release of the brake operating device, brake device 214 will release the rim to allow the bicycle wheel 23 to freely rotate.

Sixth Embodiment

Figure 16:
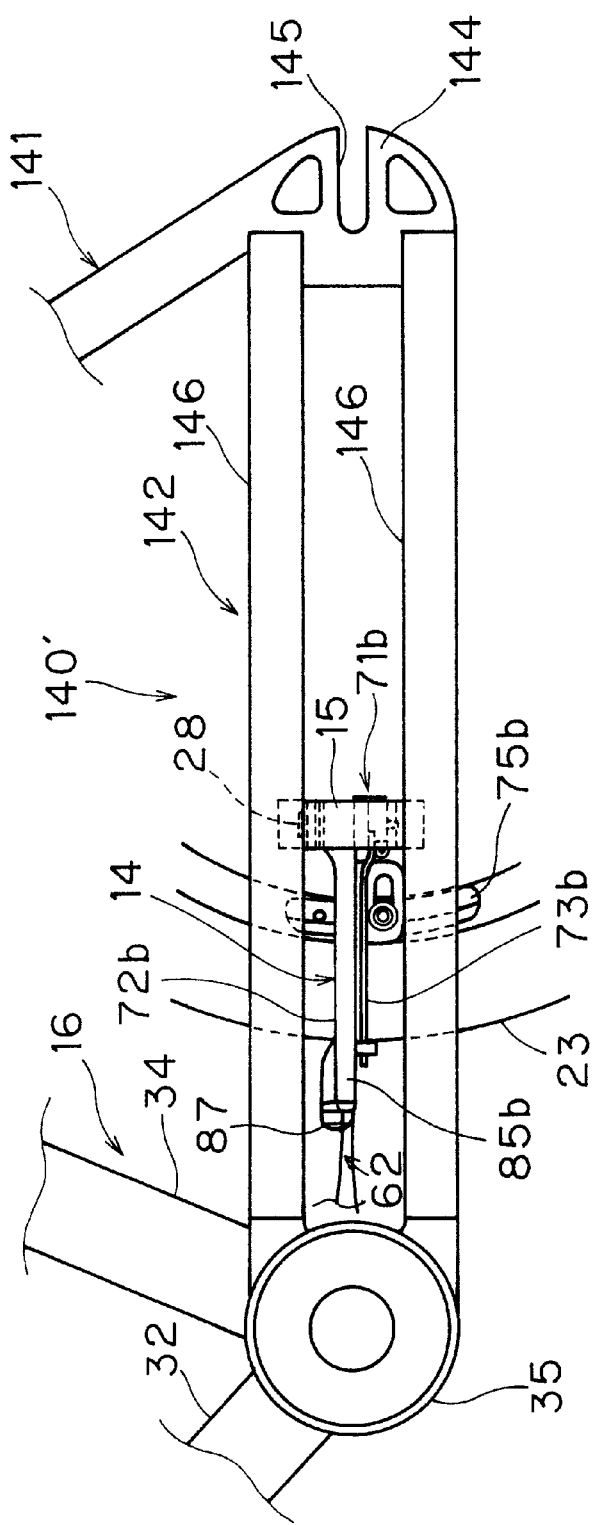
FIG. 16 is a partial side elevational view of a modified bicycle frame with a cantilever brake device movably coupled to the chain stay section via a pair of bicycle brake mounting structures in accordance with a sixth embodiment of the present invention.
Figure 17:
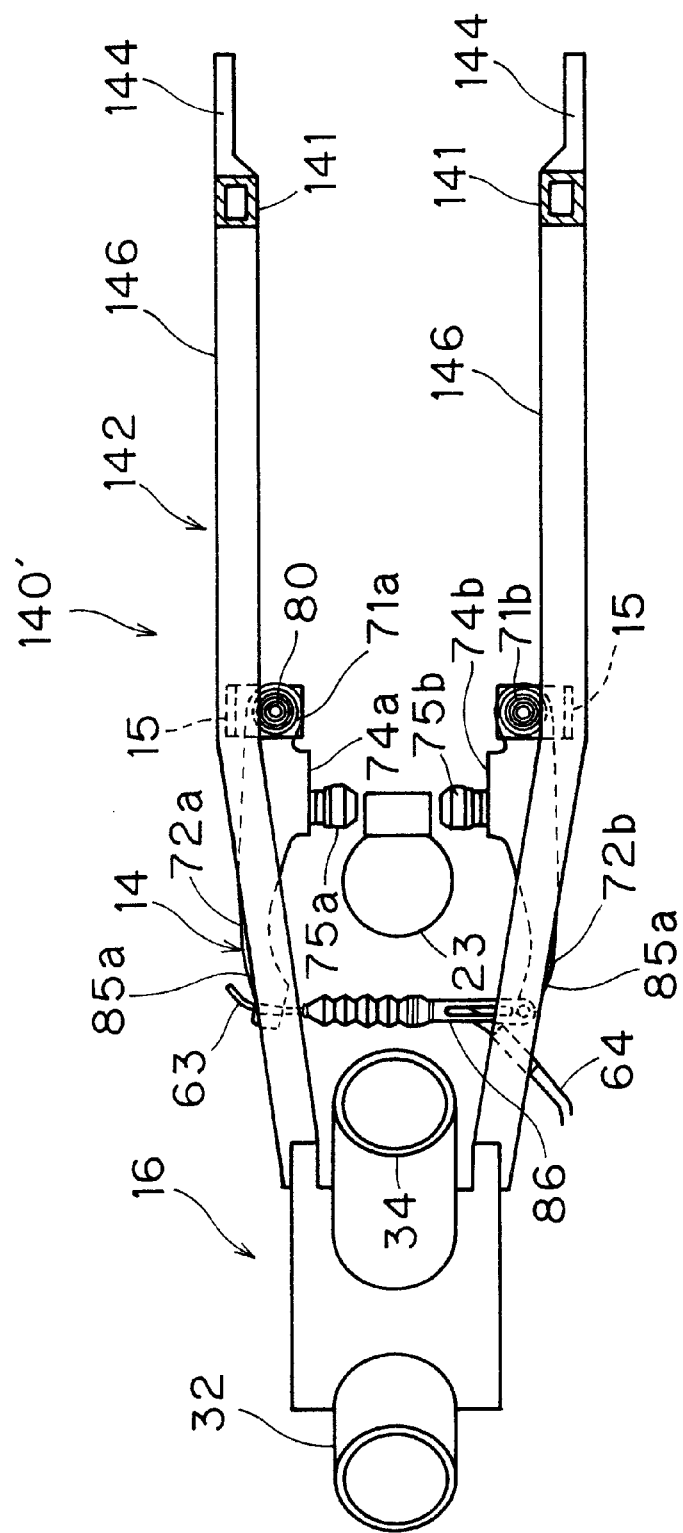
FIG. 17 is a partial top view of the modified bicycle frame illustrated in FIG. 16 with the cantilever brake device movably attached to the chain stay section via the brake mounting structures.

Referring now to FIGS. 16 and 17, the rear fork portion 140' of a modified bicycle frame 12 is illustrated in accordance with a sixth embodiment of the present invention. This sixth embodiment differs from the first embodiment in that the chain stay 142 of frame 12 has been modified to support cantilever brake device 14. In view of these similarities between the two embodiments, only the main differences between the first and sixth embodiments will be discussed and illustrated herein. Moreover, since the sixth embodiment utilizes many of the same parts of the first and third embodiments, these parts will be given the same reference numerals.

In this embodiment, the chain stay 142 is constructed of four tubular frame members 146 with the front end of each frame member 146 rigidly coupled to the bottom bracket shell 35 by welds. The rear ends of two adjacent frame members 146 are coupled together by wheel mounting ends or plates 144. The wheel mounting plates 144 have open ended slots 145 for receiving the axle of the rear hub. Adjacent pairs of the frame members 146 have mounting structures 15 fixedly coupled thereto for coupling brake device 14 thereto in substantially the same manner as in the first embodiment.

Brake device 14 is operatively coupled to a brake operating device via brake cable 62 which has an inner brake wire 63 and an outer casing 64. Basically, the rider will operate the brake operating device coupled to the handlebar which will in turn cause the brake device 14 to move inwardly to apply a braking force against the rim of the rear bicycle wheel 23. Upon release of the brake operating device, brake device 14 will release the rim to allow the bicycle wheel 23 to freely rotate.

Seventh Embodiment

Figure 18:
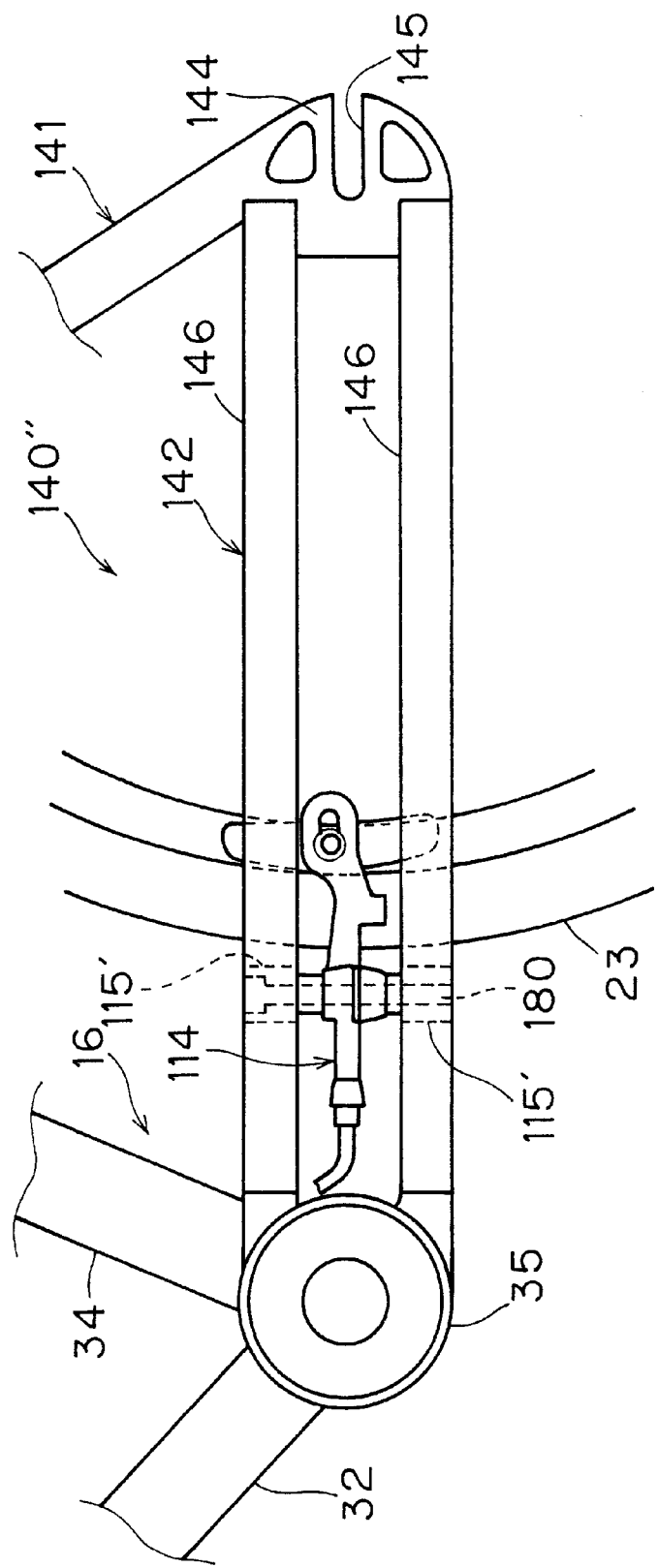
FIG. 18 is a side elevational view of a modified bicycle frame with a side pull brake device movably coupled to the chain stay section via a pair of frame mounting members or structures in accordance with a seventh embodiment of the present invention.
Figure 19:
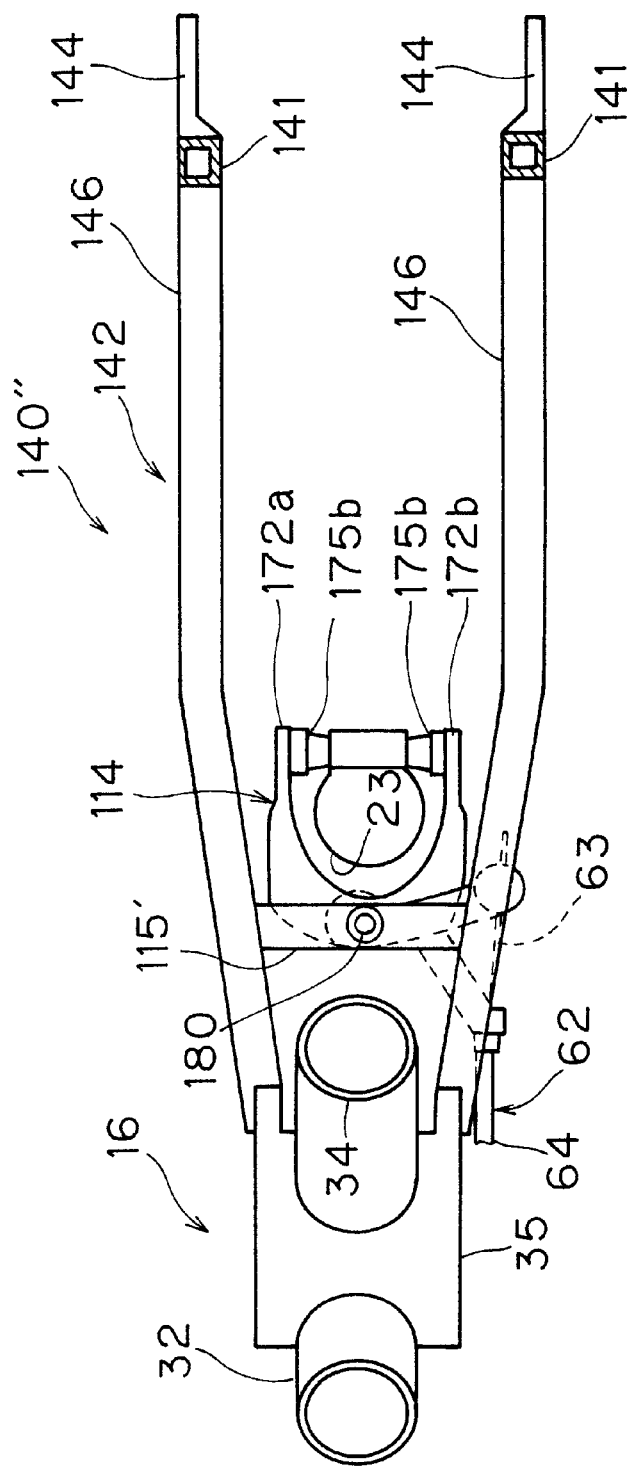
FIG. 19 is a partial top view of the modified bicycle frame illustrated in FIG. 18 with the side pull brake device movably attached to the chain stay section via a pair of frame mounting members or structures.

Referring now to FIGS. 18 and 19, the rear fork portion 140" of a modified bicycle frame 12 is illustrated in accordance with a seventh embodiment of the present invention, which is similar to the sixth embodiment. This seventh embodiment differs from the sixth embodiment in that the chain stay 142 of frame 12 has been modified to support the side pull caliper brake device 114. In view of these similarities between the two embodiments, only the main differences between the sixth and seventh embodiments will be discussed and illustrated herein. Moreover, since the seventh embodiment utilizes many of the same parts of the first and sixth embodiments, these parts will be given the same reference numerals.

Specifically, a pair of tubular frame members 115' are coupled to the frame members 43 of the seat stay 41. Each of the tubular members 115' have an axially aligned hole for receiving pivot pin 380. Preferably, the frame members 115' are parallel to each other, and together form a brake mounting structure. In other words, frame members 115' basically corresponds to brake mounting flanges 91 of brake mounting structure 15.

Brake device 114 is operatively coupled to a brake operating device via brake cable 62 which has an inner brake wire 63 and an outer casing 64. Basically, the rider will operate the brake operating device coupled to the handlebar which will in turn cause the brake device 114 to move inwardly to apply a braking force against the rim of the rear bicycle wheel 23. Upon release of the brake operating device, brake device 114 will release the rim to allow the bicycle wheel 23 to freely rotate.

Eighth Embodiment

Figure 20:
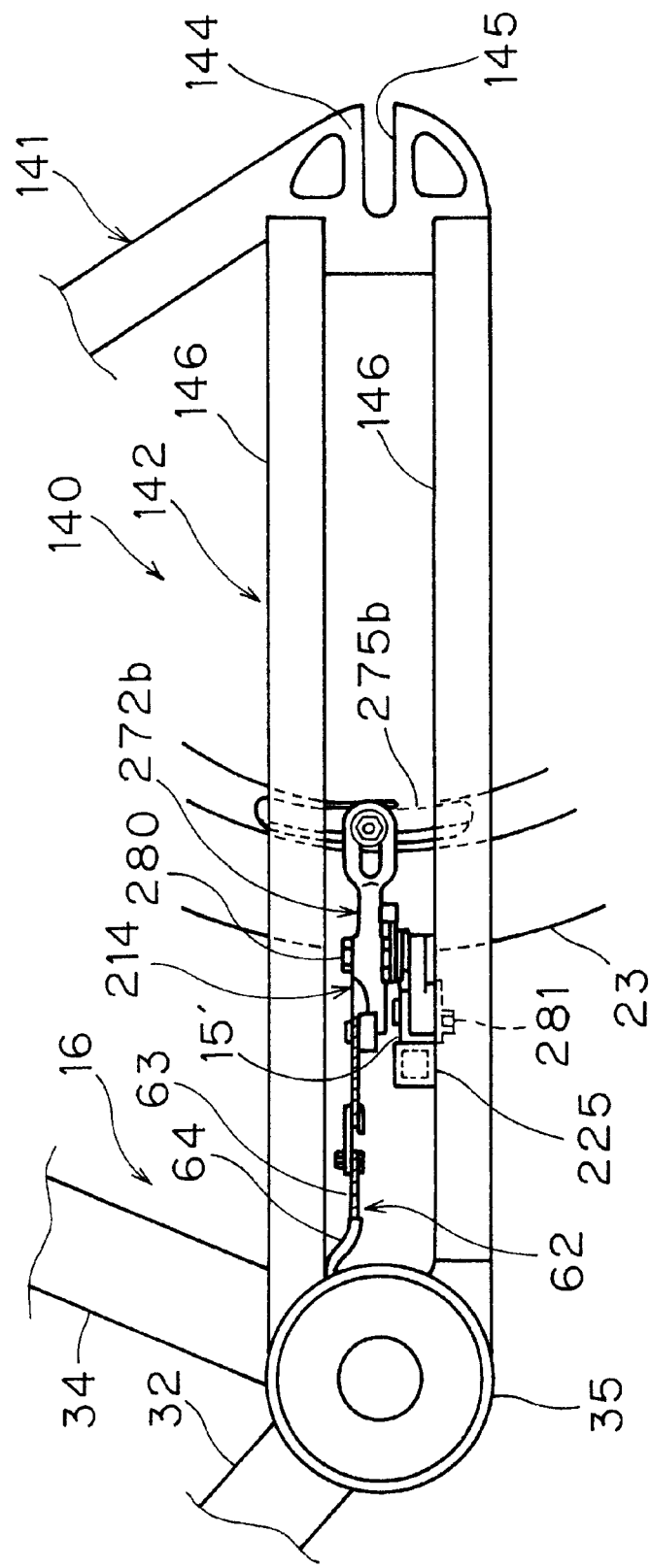
FIG. 20 is a partial side elevational view of a modified bicycle frame with a center pull brake device movably coupled to the chain stay section via a bicycle brake mounting structure in accordance with an eighth embodiment of the present invention.
Figure 21:
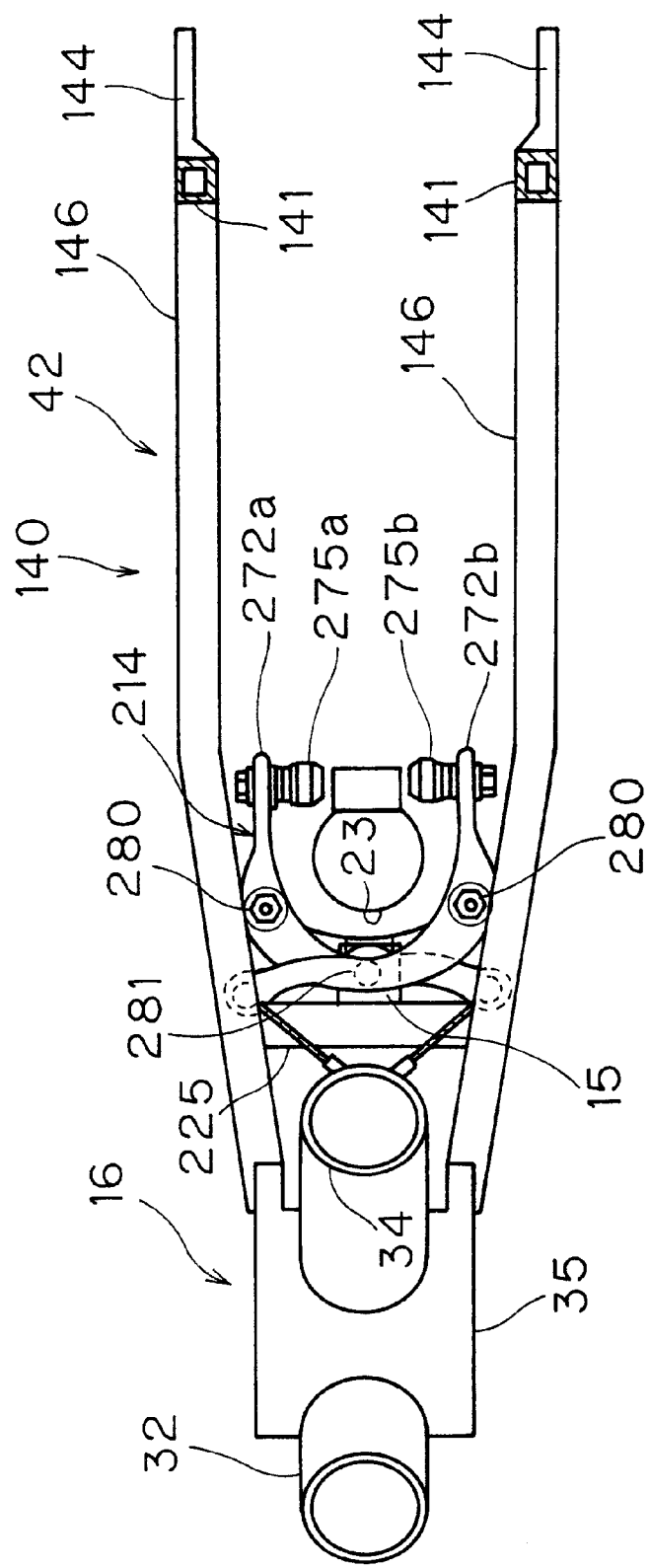
FIG. 21 is a partial top view of the modified bicycle frame illustrated in FIG. 20 with the center pull brake device attached to the chain stay section via the brake mounting structure.

Referring now to FIGS. 20 and 21, a modified rear fork portion 140 of a bicycle frame 12 is illustrated in accordance with an eighth embodiment of the present invention, which is similar to the sixth embodiment. This eighth embodiment differs from the sixth embodiment in that the chain stay 142 of frame 12 has been modified to support a center pull caliper brake device 214 in a manner that is similar to the third embodiment. In view of these similarities between the eighth embodiment and the prior embodiments, only the main differences of the eighth embodiment will be discussed and illustrated herein. Moreover, since the eighth embodiment utilizes many of the same parts of the first, third and sixth embodiments, these parts will be given the same reference numerals.

Caliper brake device 214 is a center pull type brake, which is mounted to the chain stay 142 via a mounting structure 15'. Caliper brake device 214 has a brake arm bridge 271 with a pair of brake arms 272a and 272b pivotally coupled to brake arm bridge 271 by pivot pins 280. The brake arm bridge 271 is fixedly coupled to the brake mounting structure 15' via a center mounting bolt 281. The brake arms 272a and 272b are normally biased relative to brake arm bridge 271 by a return spring 273 to a release position. In the release position, the brake pads of the brake shoes 275a and 275b are spaced from the rim of the rear wheel 23.

Brake device 214 is supported by brake mounting structure 15' to rigid tubular frame member 225 of chain stay 142. More specifically, similar to the sixth embodiment, chain stay 142 has two pairs of rigid tubular frame members 146 with one of their ends coupled to the bottom bracket shell 35, and their other ends joined together by a pair of rear wheel mounting ends or plates 144. Each of the rear wheel mounting ends or plates 144 has an open ended slot 145 for fixedly receiving the axle of the rear hub of wheel 23 in a conventional manner. However, unlike the sixth embodiment, front fork 218 also has a frame member 225 which extends between opposite frame members 146.

It will be apparent to those skilled in the art that a brake mounting structure like the one shown in FIG. 7 can be used with a pair of frame members as needed and/or desired. Moreover, a more conventional front fork can be used to mount brake device 214 thereto in accordance with the present invention.

Brake device 214 is operatively coupled to a brake operating device via brake cable 62 which has an inner brake wire 63 and an outer casing 64. Basically, the rider will operate the brake operating device coupled to the handlebar which will in turn cause the brake device 214 to move inwardly to apply a braking force against the rim of the rear bicycle wheel 23. Upon release of the brake operating device, brake device 214 will release the rim to allow the bicycle wheel 23 to freely rotate.

Ninth Embodiment

Figure 22:
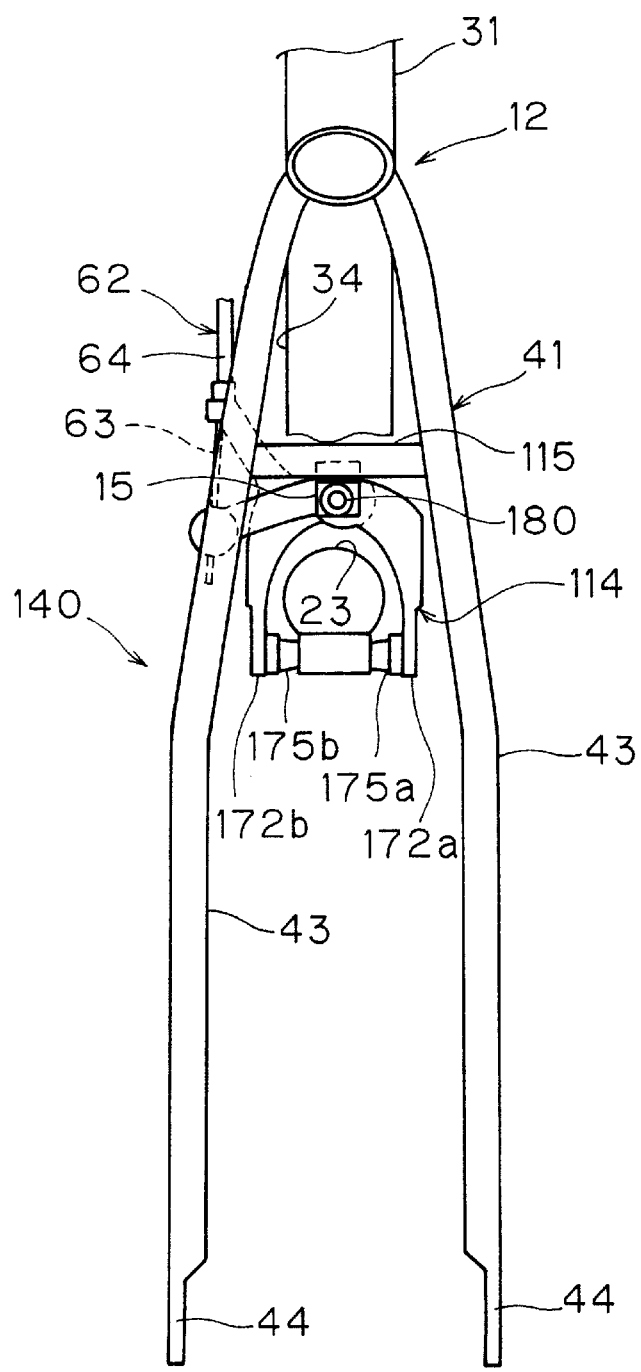
FIG. 22 is a partial front elevational view of a modified frame section with a side pull brake device coupled thereto via a brake mounting structure in accordance with a ninth embodiment of the present invention.
Figure 23:
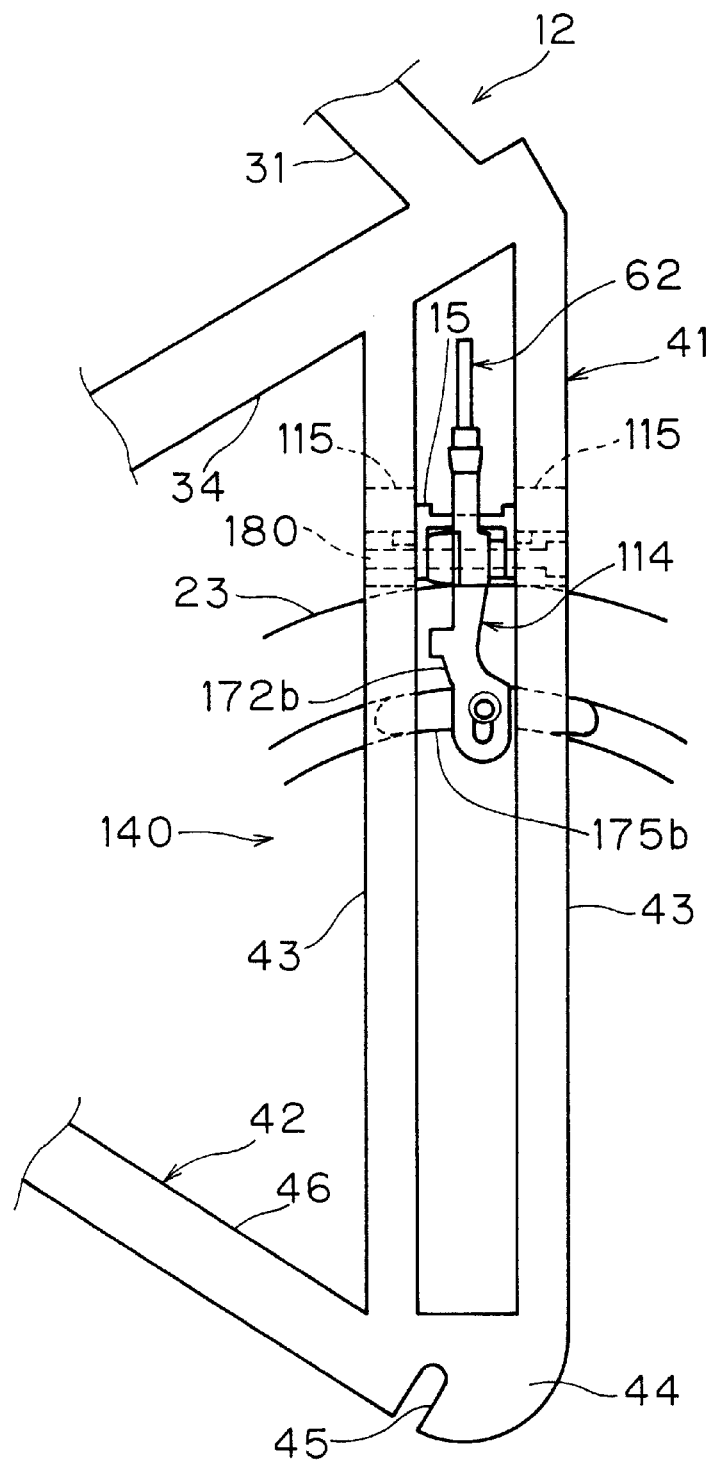
FIG. 23 is a partial left side elevational view of the front fork and the side pull brake device illustrated in FIG. 25.

Referring now to FIGS. 22 and 23, a portion of bicycle frame 12 with a modified rear fork 40 is illustrated in accordance with a ninth embodiment of the present invention. This ninth embodiment is similar to the fourth embodiment except that the side pull caliper brake device 114 is attached to frame members 115 via a single bicycle brake mounting 15. In view of these similarities between these embodiments, these embodiments will not be discussed or illustrated herein. Moreover, since the ninth embodiment utilizes many of the same parts of the first and fourth embodiments, these parts are given the same reference numeral.

Tenth Embodiment

Figure 24:
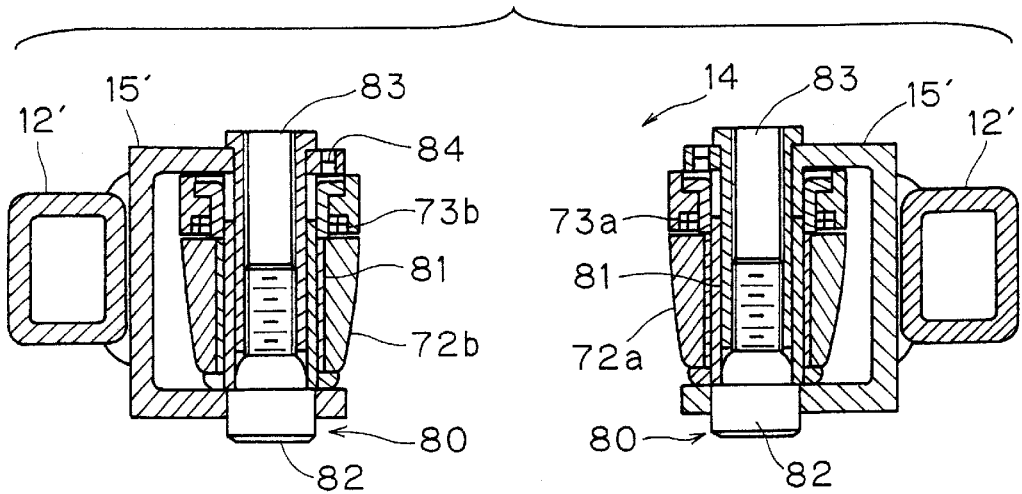
FIG. 24 is a cross-sectional view, similar to FIG. 6, of a tubular frame section with a pair of U-shaped bicycle brake mounting structures coupled to the section of a bicycle frame in accordance with the present invention.

Referring now to FIG. 24, a modified brake mounting structure 15' is illustrated in accordance with another variation of the present invention. This mounting structure 15' has its intermediate section coupled directly to a tubular frame section 12' for supporting bicycle brake device 14 of the first embodiment in substantially the same manner as discussed in the preceding embodiments which utilizes a brake mounting structure 15. This tubular frame section 12' can be part of the front bicycle fork, the seat stay and/or chain stay of a modified bicycle frame. In view of the similarities between this embodiment and the prior embodiments, this tubular frame section 12' will not be discussed or illustrated in detail herein.

Modified Frame Section

Figure 25:
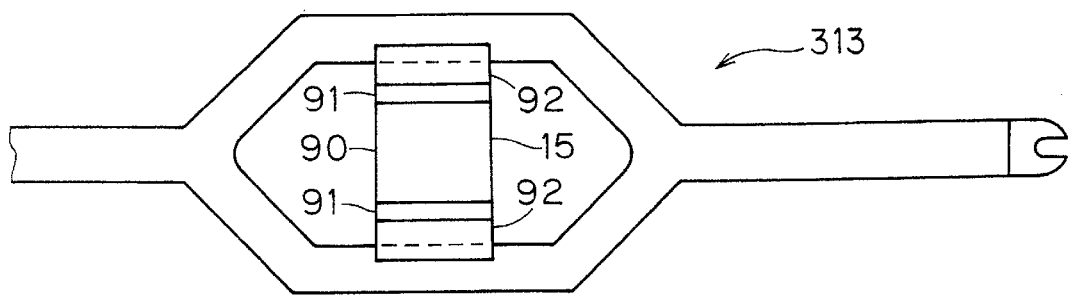
FIG. 25 is a side elevational view of a tubular frame section with a bicycle mounting structure coupled thereto for supporting a bicycle brake device in a manner in accordance with the present invention.

Referring now to FIG. 25, a tubular frame section 313 is illustrated in accordance with another embodiment of the present invention. This tubular frame section 313 can be utilized to support a bicycle brake device in substantially the same manner as discussed in the preceding embodiments which utilizes a brake mounting structure 15. This tubular frame section can be part of the front bicycle fork, the seat stay and/or chain stay of a modified bicycle frame. In view of the similarities between this embodiment and the prior embodiments, this tubular fork section will not be discussed or illustrated in detail herein.

Modified Frame Section

Figure 26:
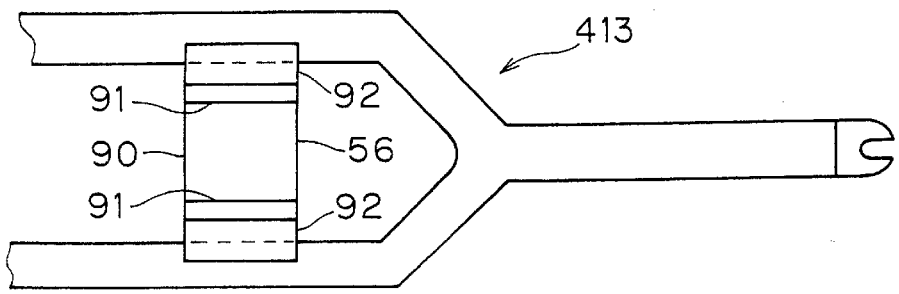
FIG. 26 is a side elevational view of another tubular frame section with a bicycle mounting structure coupled thereto for supporting a bicycle brake in a manner in accordance with the present invention.

Referring now to FIG. 26, a tubular frame section 413 is illustrated in accordance with still another embodiment of the present invention. This tubular frame section 413 can be utilized to support a bicycle brake device in substantially the same manner as discussed in the preceding embodiments which utilizes a brake mounting structure 15. This tubular frame section can be part of the front bicycle fork, the seat stay and/or chain stay of a modified bicycle frame. In view of the similarities between this embodiment and the prior embodiments, this tubular fork section will not be discussed or illustrated in detail herein.

While several embodiments of the present invention have been described and illustrated herein, it will be apparent to those skilled in the art once given this disclosure that various modifications, changes, improvements and variations may be made without departing from the spirit or scope of this invention as defined in the following claims.

What is claimed is:

1. A method of mounting a bicycle brake, comprising the steps of:
   providing a bicycle frame with first and second frame members spaced apart from each other to form a brake arm receiving recess therebetween;
   providing a bicycle brake with a pair of brake arms movably mounted relative to each other via at least one pivot member having first and second ends; and
   mounting said first end of said at least one pivot member to said first frame member and said second end of said at least one pivot member to said second frame member such that said at least one pivot member is located out of a plane defined by said first and second frame members.

2. A method of mounting a bicycle brake according to claim 1, wherein said first and second rigid frame members are tubular members.

3. A method of mounting a bicycle brake according to claim 1, wherein said first and second rigid frame members are rigidly coupled together to form at least part of a front bicycle fork.

4. A method of mounting a bicycle brake according to claim 1, wherein said first and second rigid frame members are rigidly coupled together to form at least part of a bicycle chain stay.

5. A method of mounting a bicycle brake according to claim 1, wherein said first and second rigid frame members are rigidly coupled together to form at least part of a seat stay.

6. A method of mounting a bicycle brake according to claim 1, wherein said first and second rigid frame members are coupled together at one end by a bicycle wheel mounting portion having a slot adapted to receive an axle of a bicycle wheel.

7. A method of mounting a bicycle brake according to claim 1, wherein said at least one pivot member is mounted to said first and second frame member via first and second brake mounting portions, respectively; and said first and second brake mounting portions are connected together by an intermediate member to form a substantially U-shaped member.

8. A method of mounting a bicycle brake according to claim 7, wherein said first and second brake mounting portions have first and second axially aligned holes, respectively.

9. A method of mounting a bicycle brake according to claim 8, wherein one of said first and second brake mounting portions has a third hole.

\* \* \* \* \*